(12) United States Patent
Kim et al.

(10) Patent No.: US 10,977,491 B2
(45) Date of Patent: Apr. 13, 2021

(54) DEVICE FOR PROVIDING INFORMATION RELATED TO OBJECT IN IMAGE

(71) Applicant: SAMSUNG ELECTRONICS CO., LTD., Suwon-si (KR)

(72) Inventors: Hyung Joon Kim, Hwaseong-si (KR); Heung Ki Lee, Suwon-si (KR); Byung Jun Son, Suwon-si (KR); Tae Hwa Hong, Seoul (KR); Hyung Suk Kim, Seongnam-si (KR); Ji Yoon Park, Yongin-si (KR); Dae Kyu Shin, Suwon-si (KR); Je Han Yoon, Seongnam-si (KR); Hoo Hyoung Lee, Suwon-si (KR); Sung Dae Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 15/924,742

(22) Filed: Mar. 19, 2018

(65) Prior Publication Data

US 2018/0276473 A1 Sep. 27, 2018

(30) Foreign Application Priority Data

Mar. 27, 2017 (KR) .................. 10-2017-0038691

(51) Int. Cl.
*G06K 9/00* (2006.01)
*G06F 3/0488* (2013.01)
(Continued)

(52) U.S. Cl.
CPC ....... *G06K 9/00671* (2013.01); *G06F 3/0482* (2013.01); *G06F 3/0488* (2013.01);
(Continued)

(58) Field of Classification Search
CPC combination set(s) only.
See application file for complete search history.

(56) References Cited

U.S. PATENT DOCUMENTS 6,700,589 B1 * 3/2004 Canelones .......... G06F 16/9577
345/660
8,115,821 B2 2/2012 Maki et al.
(Continued)

FOREIGN PATENT DOCUMENTS

JP 2017-058971 3/2017
KR 10-2012-0088234 8/2012
(Continued)

OTHER PUBLICATIONS

Extended Search Report dated Jun. 14, 2018 in counterpart European Patent Application No. 18164309.9.
(Continued)

*Primary Examiner* — Mekonen T Bekele
(74) *Attorney, Agent, or Firm* — Nixon & Vanderhye P.C.

(57) ABSTRACT

An electronic device includes a camera module, a display, and a processor. The processor is configured to display a preview image including one or more objects using the camera module, to display a first user interface corresponding to the one or more objects or a second user interface, in the display, to receive an input to select the first user interface or the second user interface, to obtain a first image in a first scheme using the camera module if the first user interface is selected, to obtain a second image using the camera module in a second scheme different from the first scheme if the second user interface is selected, and to provide information associated with the one or more objects using the first image and/or the second image, which is obtained based at least on the input.

20 Claims, 24 Drawing Sheets

(51) Int. Cl.
  *G06K 9/32* (2006.01)
  *G06F 16/432* (2019.01)
  *G06Q 30/02* (2012.01)
  *G06F 3/0482* (2013.01)
  *G06K 9/20* (2006.01)
  *G06Q 30/06* (2012.01)

(52) U.S. Cl.
  CPC ....... *G06F 16/434* (2019.01); *G06K 9/00456* (2013.01); *G06K 9/2081* (2013.01); *G06K 9/3233* (2013.01); *G06K 9/3241* (2013.01); *G06K 9/3258* (2013.01); *G06Q 30/0268* (2013.01); *G06Q 30/06* (2013.01)

(56) References Cited

U.S. PATENT DOCUMENTS

| | | | |
|---|---|---|---|
| 8,400,548 B2 | 3/2013 | Bilbrey et al. | |
| 8,625,018 B2 | 1/2014 | Bilbrey et al. | |
| 9,154,536 B2* | 10/2015 | Nguyen | H04N 21/23103 |
| 9,305,402 B2 | 4/2016 | Bilbrey et al. | |
| 9,449,343 B2 | 9/2016 | Mayerle et al. | |
| 9,503,626 B2* | 11/2016 | Chang | H04N 21/43615 |
| 9,791,921 B2 | 10/2017 | Poulos et al. | |
| 9,900,515 B2 | 2/2018 | Kim et al. | |
| 10,298,828 B2* | 5/2019 | Hayashi | H04N 5/23203 |
| 2003/0234799 A1* | 12/2003 | Lee | G06F 3/1407 345/660 |
| 2004/0095477 A1 | 5/2004 | Maki et al. | |
| 2006/0071949 A1* | 4/2006 | Sakuma | G06F 3/04897 345/660 |
| 2007/0106767 A1 | 5/2007 | Yamamoto | |
| 2008/0122949 A1* | 5/2008 | Kindborg | G08B 13/19676 348/231.99 |
| 2009/0122164 A1 | 5/2009 | Maki et al. | |
| 2011/0141319 A1* | 6/2011 | Watazawa | H04N 5/23219 348/240.2 |
| 2011/0164163 A1 | 7/2011 | Bilbrey et al. | |
| 2011/0249075 A1* | 10/2011 | Abuan | G06F 9/451 348/14.02 |
| 2012/0223966 A1* | 9/2012 | Lim | G06F 3/011 345/633 |
| 2012/0275705 A1* | 11/2012 | Duan | G06K 9/00664 382/195 |
| 2013/0155307 A1 | 6/2013 | Bilbrey et al. | |
| 2013/0275411 A1* | 10/2013 | Kim | G06F 3/04842 707/722 |
| 2014/0100997 A1* | 4/2014 | Mayerle | G06Q 30/0643 705/27.2 |
| 2014/0111547 A1 | 4/2014 | Bilbrey et al. | |
| 2014/0237366 A1 | 8/2014 | Poulos et al. | |
| 2014/0320724 A1 | 10/2014 | Kim et al. | |
| 2015/0177953 A1* | 6/2015 | Khalsa | H04N 21/47205 715/716 |
| 2016/0203648 A1 | 7/2016 | Bilbrey et al. | |
| 2016/0219211 A1* | 7/2016 | Katayama | H04N 5/23293 |
| 2016/0274762 A1 | 9/2016 | Lopez et al. | |
| 2017/0076503 A1 | 3/2017 | Tamaoki et al. | |
| 2017/0351665 A1* | 12/2017 | Kim | G06F 3/04883 |
| 2018/0011534 A1 | 1/2018 | Poulos et al. | |
| 2018/0130351 A1* | 5/2018 | Ha | G06T 11/60 |
| 2018/0173401 A1* | 6/2018 | Kim | G06F 3/014 |

FOREIGN PATENT DOCUMENTS

| | | |
|---|---|---|
| KR | 10-2014-0127507 | 11/2014 |
| KR | 10-2016-0086717 | 7/2016 |

OTHER PUBLICATIONS

Search Report and Written Opinion dated Jun. 18, 2018 in counterpart International Patent Application No. PCT/KR2018/002781.
Topkara, Mercan et al, "Enabling Multiple QR Codes in Close Proximity", Oct. 28, 2015, pp. 1-8, XP055478780, retrieved from the Internet: url: https://arxiv.org/ftp/arxiv/papers/1510/1510.08210.pdf [retrieved May 28, 2018].

* cited by examiner

Send email

To:samsung.kim@samsung.com

FIG.12B

Add event 2016.09.22
GWP workshop@yangjae

FIG.12C

Call 02-1234-1234

FIG.12D

DEVICE FOR PROVIDING INFORMATION RELATED TO OBJECT IN IMAGE

CROSS-REFERENCE TO RELATED APPLICATION

This application is based on and claims priority under 35 U.S.C. § 119 to a Korean patent application filed on Mar. 27, 2017 in the Korean Intellectual Property Office and assigned Serial number 10-2017-0038691, the disclosure of which is incorporated by reference herein in its entirety.

TECHNICAL FIELD

The present disclosure relates to a technology that provides information associated with an object in an image.

BACKGROUND

A service recognizing an object in an image obtained in real time by using a camera of a mobile phone has been provided with the development of a technology recognizing an object in an image.

For example, an application that recognizes a QR code may recognize a QR code in a preview image and may provide a user with information defined in the QR code. For another example, an application that searches for a wine label may recognize the wine label of a wine bottle in a preview image and may provide the user with information about the wine.

This conventional technology may recognize only a preset type of an object.

Since a conventional technology recognizes only a preset type of an object, it is difficult to recognize various types of objects in one image. In addition, when obtaining an image for the purpose of providing information of the recognized object even though recognizing various types of objects in one image, the conventional technology may obtain the image in the same scheme.

SUMMARY

According to an example aspect of the present disclosure, the present disclosure not only recognizes a plurality of objects in one image, but also recognizes various types of objects at a time.

The present disclosure may provide information with fewer operations by changing a scheme that obtains an image for providing information of an object based on the characteristic of the recognized object, a type of information that a user desires to receive, context information, or the like.

For the purpose of recognizing an object, the present disclosure may skip unnecessary operations with reference to various pieces of information.

In accordance with an aspect of the present disclosure, an electronic device includes a camera module comprising image obtaining circuitry, a display, and a processor electrically connected to the camera module and the display. The processor is configured to display a preview image including one or more objects using the camera module in the display, to display a first user interface corresponding to the one or more objects and/or a second user interface different from the first user interface, in the display, to receive an input to select the first user interface or the second user interface, to obtain a first image including the one or more objects in a first scheme using the camera module if the first user interface is selected based at least on the input, to obtain a second image including the one or more objects using the camera module in a second scheme different from the first scheme if the second user interface is selected based at least on the user input, and to provide information associated with the one or more objects using the first image or the second image, which is obtained based at least on the input.

In accordance with an aspect of the present disclosure, an electronic device includes a memory storing an image, a display, and a processor electrically connected to the memory and the display. The processor is configured to display a first image which is stored in the memory and which includes one or more objects using the display, to display a plurality of user interfaces corresponding to the one or more objects using the display, to receive an input to select a first user interface from among a plurality of user interfaces, to obtain a second image including the one or more objects from the first image in a scheme corresponding to a type of the selected first user interface, and to provide information associated with an object included in the second image based on a type of the selected first user interface and the obtained second image.

In accordance with an aspect of the present disclosure, an electronic device includes a memory, a display, and a processor electrically connected to the memory and the display. The processor is configured to display a first image including one or more objects using the display, to obtain a second image including the one or more objects in a scheme corresponding to one attribution information which is determined based at least on context information from among pieces of attribution information corresponding to the one or more objects, and to provide information associated with the one or more objects using the second image.

In accordance with an aspect of the present disclosure, an electronic device includes a camera module comprising image obtaining circuitry, a display, a memory storing a camera application associated with the camera module, and a processor electrically connected to the camera module, the display, and the memory. The processor is configured to execute the camera application, to obtain a preview image including a first object and a second object using the camera module, to display a screen including the preview image, to display a first user interface corresponding to the first object, and to display a second user interface corresponding to the second object, to obtain a first image including the first object using the camera module in a first scheme if the first user interface is selected, to obtain a second image including the second object using the camera module in a second scheme different from the first scheme if the second user interface is selected, and to display information associated with the first object or the second object in the display using the first image or the second image.

In accordance with an aspect of the present disclosure, an electronic device includes a display, a memory storing an image including a first object and a second object, and a processor electrically connected to the display and the memory. The processor is configured to receive an input to select the image, to display a screen including the image, to display a first user interface corresponding to the first object, and to display a second user interface corresponding to the second object in response to the input, to obtain a first image including the first object from the image in a first scheme if the first user interface is selected, to obtain a second image including a second object from the image in a second scheme different from the first scheme if the second user interface is selected, and to display information associated with the first object or the second object in the display using the first image or the second image.

According to various embodiments of the present disclosure, one application may provide information associated with various types of objects.

According to various embodiments, the current consumption may decrease by reducing unnecessary operations.

According to various embodiments, since an image is obtained in a capture mode determined based on a type of the provided information, the characteristic of an object, or the like, a memory may be used more effectively.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIGS. 12B, 12C and 12D are diagrams illustrating information defined in a QR code, according to various embodiments;

Throughout the drawings, it should be noted that like reference numbers are used to depict the same or similar elements, features, and structures.

DETAILED DESCRIPTION

Figure 1:
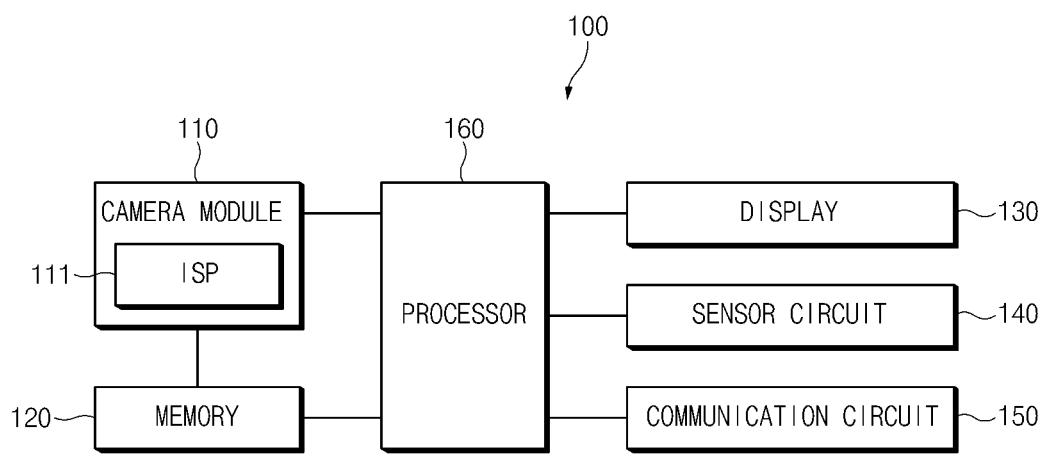
FIG. 1 is a block diagram illustrating an example configuration of an electronic device, according to an embodiment.

Hereinafter, various example embodiments of the present disclosure may be described with reference to accompanying drawings. Accordingly, those of ordinary skill in the art will recognize that modifications, equivalents, and/or alternatives of the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. On the other hand, when an element (e.g., a first element) is referred to as being "directly coupled with/to" or "directly connected to" another element (e.g., a second element), it should be understood that there are no intervening elements (e.g., a third element).

According to the situation, the expression "configured to" used in this disclosure may be used interchangeably with, for example, the expression "suitable for", "having the capacity to", "designed to", "adapted to", "made to", or "capable of". The term "configured to" does not refer only to "specifically designed to" in hardware. Instead, the expression "a device configured to" may refer to a situation in which the device is "capable of" operating together with another device or other components. For example, a "processor configured to (or set to) perform A, B, and C" may refer, for example, and without limitation, to a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices, or the like, but is not limited thereto. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit), or the like, but is not limited thereto.

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like, but is not limited thereto.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like), or the like, but is not limited thereto.

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like), or the like, but is not limited thereto. According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 is a block diagram illustrating an example configuration of an electronic device, according to an embodiment.

Referring to FIG. 1, an electronic device 100 may include a camera module (e.g., including image capturing circuitry) 110, a memory 120, a display 130, a sensor circuit 140, a communication circuit 150, and a processor (e.g., including processing circuitry) 160. The electronic device 100 may further include any other element(s) as well as illustrated elements or may exclude some of the illustrated elements. According to an embodiment, the electronic device 100 may further include a hardware/software configuration described with reference to FIGS. 17 to 19 below. According to an embodiment, the electronic device 100 may omit the sensor circuit 140 and/or the communication circuit 150.

The camera module 110 may include various circuitry to capture a still image and a video and may include an image signal processor (ISP) (e.g., including image processing circuitry) 111, or the like. The ISP 111 may store an image, which the image sensor of the camera module 110 obtains, in a buffer and may change the resolution of a preview image, which is displayed in the display 130 in real time, or an image obtained to generate an image to be stored in the memory 120. According to an embodiment, the resolution of the preview image may be determined depending on the resolution of the display 130. According to an embodiment, the resolution of the image to be stored in the memory 120 may be determined by settings of a user or the operation of the processor 160 to be described later.

The memory 120 may include a volatile and/or nonvolatile memory. The memory 120 may store a command or data associated with an element of the electronic device 100. For example, the memory 120 may store data of a function or the like to be executed with respect to an object of a user interface (UI), depending on an input scheme corresponding to a type of an object displayed in the display 130 or depending on an input. According to an embodiment, the memory 120 may store an image that the camera module 110 obtains, and may store information necessary for the processor 160 to provide information. According to an embodiment, the memory 120 may store information about an object in the stored image, and the information about the object may include category information of the object. According to an embodiment, the memory 120 may store user input history, information history provided by the processor 160, and the like.

The display 130 may output the execution screen of an application. According to an embodiment, the display 130 may be integrally implemented with a touch panel (e.g., a touch screen panel or the like). In this case, the user may generate a user input by touching the display 130. In other words, in the case where the display 130 is integrally implemented with a touch panel, it is understood that the display 130 performs the functions of both an input device and an output device.

The sensor circuit 140 may measure a physical quantity or may sense an operating state of the electronic device 100. According to an embodiment, the sensor circuit 140 may include a motion sensor to sense the movement of the electronic device 100.

The communication circuit 150 may allow the electronic device 100 to communicate with an external server. According to an embodiment, the communication circuit 150 may transmit a text, an image, and the like to the external server and may receive information corresponding to data received from the external server.

The processor 160 may include various processing circuitry and control the overall operation of the electronic device 100. The processor 160 may implement various modules (e.g., program elements) by executing the instructions stored in the memory 120. Hereinafter, a module implemented by the processor 160 will be described with reference to FIG. 2.

Figure 2:
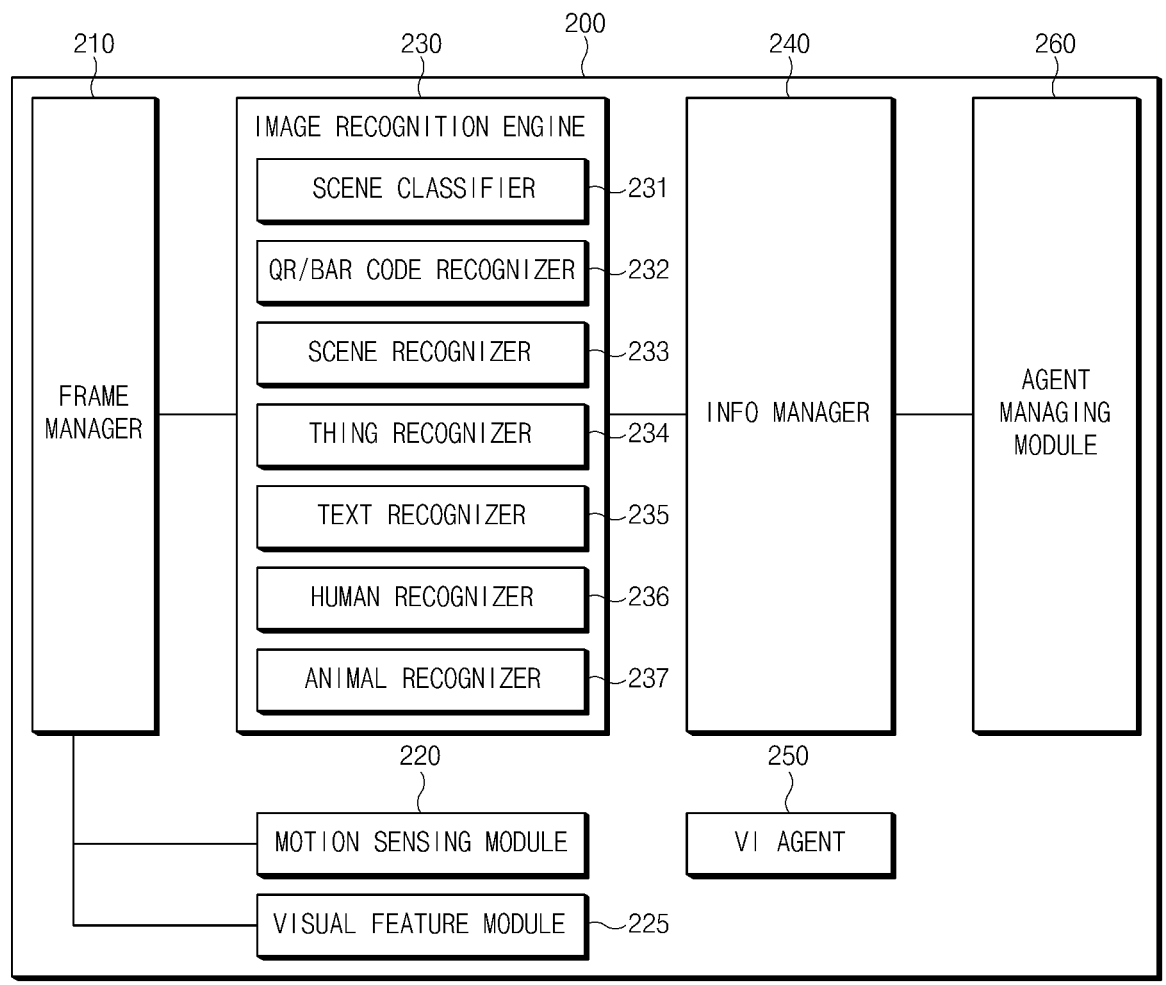
FIG. 2 is a block diagram illustrating an example module implemented by a processor, according to an embodiment.

FIG. 2 is a block diagram illustrating an example module implemented by a processor, according to an embodiment.

Referring to FIG. 2, a processor 200 may include a frame manager (e.g., including processing circuitry and/or program elements) 210, a motion sensing module (e.g., including processing circuitry and/or program elements) 220, a visual feature module (e.g., including processing circuitry and/or program elements) 225, an image recognition engine (e.g., including processing circuitry and/or program elements) 230, an info manager (e.g., including processing circuitry and/or program elements) 240, a vision intelligence (VI) agent (e.g., including processing circuitry and/or program elements) 250, and an agent managing module (e.g., including processing circuitry and/or program elements) 260. Accordingly, it is understood that operations performed by modules described below are performed by the processor 200.

According to an embodiment, one or more modules among the modules implementable by the processor 200 may be omitted. For example, the VI agent 250 may be omitted in the processor 200.

According to an embodiment, the frame manager 210 may transmit an image received from the camera module 110 or the memory 120, to the image recognition engine 230 and the motion sensing module 220. According to an embodiment, the frame manager 210 may change the resolution of the received image and may transmit the image, the resolution of which is changed. According to an embodiment, the frame manager 210 may rotate the received image based on information about a tilt state of the electronic device 100, which is received from the motion sensing module 220, and may transmit the rotated image. According to an embodiment, in the case where the frame manager 210 transmits a preview image, the frame manager 210 may transmit the preview image at a point in time when the motion value of the electronic device 100 is not greater than a preset value, based on motion information received from the motion sensing module 220.

According to an embodiment, the motion sensing module 220 may generate the motion information of the electronic device 100 using the image received from the frame manager 210. According to an embodiment, the motion sensing module 220 may generate information about the tilt state of the electronic device 100, based on the sensing signal received from a motion sensor of the electronic device 100 and may transmit the information about the tilt state to the frame manager 210. According to an embodiment, the motion information that the motion sensing module 220 generates may be used to determine whether to operate the image recognition engine 230. For example, on the basis of the generated motion information, the image recognition engine 230 may recognize an object in an image in the case where the motion value is not greater than a critical value, and may not operate in the case where the motion value is greater than the critical value.

According to an embodiment, the visual feature module 225 may generate visual feature effect information about an object included in the image, using the received image to transmit the visual feature effect information to an application. The application may apply the visual feature effect to the image using the visual feature effect information received from the motion sensing module 220 and may display the image to which the visual feature effect is applied, in the display 130. According to an embodiment, for the purpose of notifying a user that the image recognition engine 230 is operating, only in the case where the image recognition engine 230 operates, the visual feature module 225 may generate the visual feature effect information. According to an embodiment, the visual feature effect may be a visual effect displayed at a feature point of an object included in the image.

According to an embodiment, the image recognition engine 230 may recognize an object in an image received from the frame manager 210, may generate region of interest (ROI) information including the recognized object, and may include various program elements, such as, for example, and without limitation, a scene classifier 231, a QR/bar code recognizer 232, a scene recognizer 233, a thing recognizer 234, a text recognizer 235, a human recognizer 236, and an animal recognizer 237, or the like. However, the recognizers that the image recognition engine 230 is capable of including are not limited to this exemplification, and may further include a proper recognizer for recognizing an object. According to various embodiments, the processor 200 may add a recognizer of the image recognition engine 230 based on the data received from the external server.

According to various embodiments, the operation of the image recognition engine 230 may be performed by the external server. The processor 200 may transmit information (e.g., an image file, a feature point, an analysis result, a keyword, meta data, or the like) associated with an image to the external server using the communication circuit 150 and may receive the image recognition result from the external server.

According to an embodiment, the scene classifier 231 may generate type information of the image using the received image. For example, in the case where a text is included in the image, the scene classifier 231 may generate information about the fact that a type of the image is a document. For another example, in the case where a mountain is included in the image, the scene classifier 231 may generate information about the fact that a type of the image is a scene. According to an embodiment, the scene classifier 231 may transmit the generated type information to at least one recognizer among the QR/bar code recognizer 232, the scene recognizer 233, the thing recognizer 234, the text recognizer 235, the human recognizer 236, or the animal recognizer 237.

According to an embodiment, the QR/bar code recognizer 232 may recognize a QR code and a bar code included in an image, may generate information about the fact that the image includes the QR code or the bar code, and information about an area including a QR code object or a bar code object, and may transmit the generated information to the info manager 240.

According to an embodiment, the scene recognizer 233 may recognize the scene included in an image. The scene recognizer 233 may generate information about the fact that the image includes a scene, and information about an area including a scene object and may transmit the generated information to the info manager 240.

According to an embodiment, the thing recognizer 234 may recognize a thing included in an image. The thing recognizer 234 may transmit information about the fact that the image includes a thing, and information about an area including a thing object to the info manager 240. For example, the thing recognizer 234 recognize a wine bottle, may generate information about an area including the wine bottle or information about an area including a label object of the wine bottle, and may transmit the generated information to the info manager 240.

According to an embodiment, the text recognizer 235 may recognize a text included in an image. The text recognizer 235 may generate information about the fact that the image includes a text, and information about an area including a text object and may transmit the generated information to the info manager 240.

According to an embodiment, the human recognizer 236 may recognize a human included in an image. The human recognizer 236 may transmit information about the fact that the image includes a human, and information about an area including a human object to the info manager 240.

According to an embodiment, the animal recognizer 237 may recognize an animal included in an image. The animal recognizer 237 may transmit information about the fact that the image includes an animal, and information about an area including an animal object to the info manager 240.

According to an embodiment, the info manager 240 may receive information that the image recognition engine 230 generates and may transmit at least part of the received information to the application. In other words, the info manager 240 may provide the application with the received information in a format required by the application.

According to an embodiment, the info manager 240 may generate new information based on the received information to transmit the new information to the application. According to an embodiment, the info manager 240 may generate information about the priority among pieces of information received from the plurality of recognizers. For example, the info manager 240 may receive information about the fact that an image includes a QR code from the QR/bar code recognizer 232, may receive information about the fact that an image includes a scene from the scene recognizer 233, and may receive information about the fact that an image includes a text from the text recognizer 235. The info manager 240 may generate priority information about the fact that the QR code is ranked as the first priority, priority information about a text is ranked as the second priority, and priority information about a scene is ranked as the third priority, based on the preset priority information.

According to an embodiment, the info manager 240 may transmit information, which is received from each of the recognizers, about an area including the object to the application. For example, the info manager 240 may transmit only ROI information of an object corresponding to the top priority, to the application based on the above-described priority information.

According to an embodiment, the info manager 240 may transmit information about a recognizer recognizing an object, to the application. For example, in the case where information about an object that the scene recognizer 233 and the text recognizer 235 recognize is transmitted to the info manager 240, the info manager 240 may transmit information about the fact that the object has been recognized by the scene recognizer 233 and the text recognizer 235, to the application.

According to an embodiment, the application may display a user interface based on information received from the info manager 240 and may display information associated with an object based on a user input, or the like.

According to an embodiment, the VI (vision intelligence) agent 250 may generate category information of an image to store the category information in the memory 120. For example, the VI agent 250 may set the category of the image to a human, furniture, clothes, a vehicle, or the like. The VI agent 250 may further set a sub category of the set category. For example, the VI agent 250 may set the sub category such as a chair, a desk, a stand, a light bulb, or the like. According to an embodiment, the VI agent 250 may receive information associated with an object that the image recognition engine 230 generates and may set the sub category of an image using information associated with the received object.

According to an embodiment, the VI agent 250 may store information that image data has, such as the color of an image, the storage time point of the image, the capture location of the image, or the like, in the memory 120. When searching for an image, the VI agent 250 may use the information stored in the memory 120.

According to an embodiment, for the purpose of providing information associated with an object, the agent managing module 260 may determine whether to transmit a query to the external server, based on at least one of information which the info manager 240 transmits, a user input, or context information. In other words, for the purpose of providing the information associated with the object, the agent managing module 260 may determine whether to use a first database stored in the memory 120 or whether to use a second database stored in the external server, based on the selected user interface. In addition, according to an embodiment, the agent managing module 260 may determine the external server that is going to transmit a query. For example, a preview image that the camera module 110 obtains may include a mobile phone object, and the processor 200 may receive a user input to select a product search UI corresponding to the mobile phone object. In this case, the agent managing module 260 may determine to transmit an image in which the mobile phone object is included and a product information search query corresponding to the image to the external server, based on the selected product search UI and may determine that the external server is an Internet shopping mall server.

Hereinafter, the operation of the electronic device 100 according to an embodiment will be described based on the above-described configuration. In the following description, it is assumed that the electronic device 100 includes all or part of the above-described configurations.

(1) The Overall Operations

The overall operations according to an embodiment will be described with reference to FIG. 3.

Figure 3:
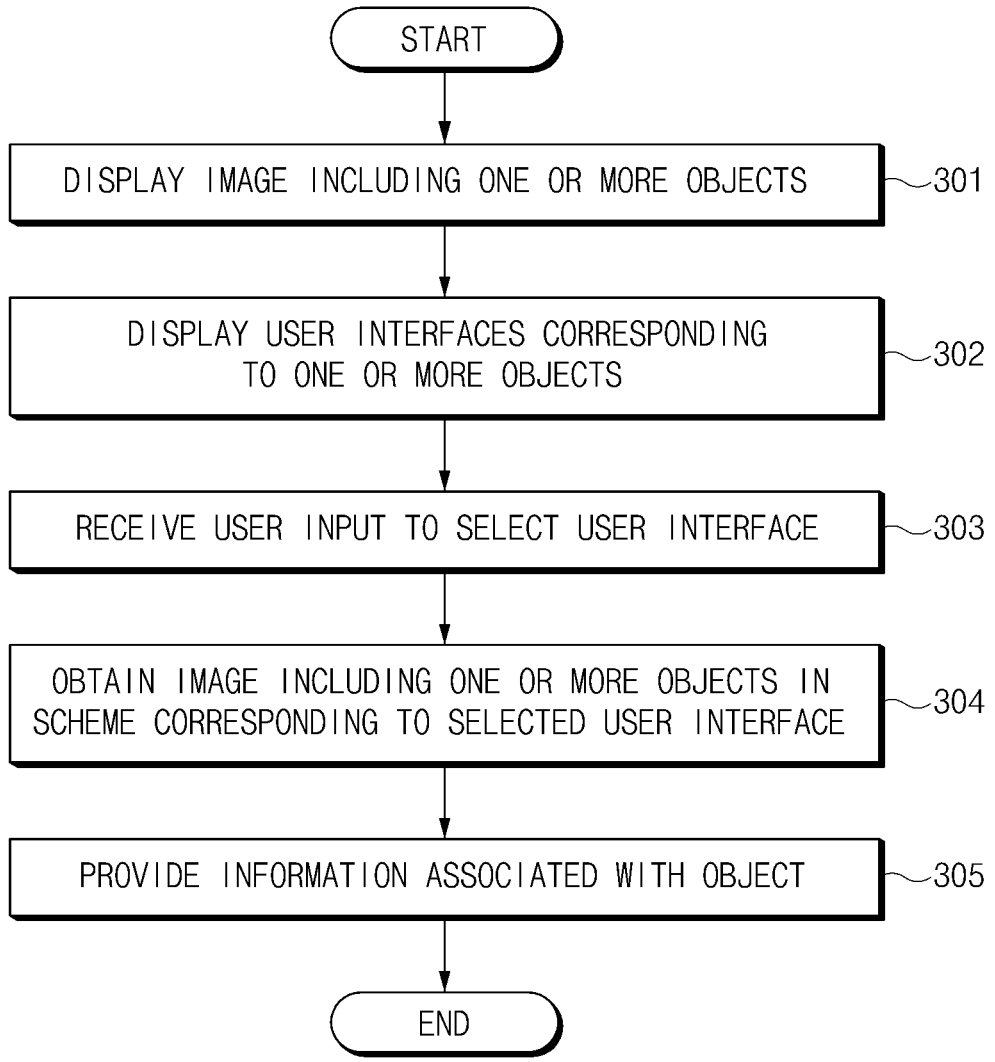
FIG. 3 is a flowchart illustrating an example method of providing information associated with an object included in an image, according to an embodiment.

FIG. 3 is a flowchart illustrating an example method of providing information associated with an object included in an image, according to an embodiment.

Referring to FIG. 3, in operation 301, the processor 160 may display an image including one or more objects, in the display 130. According to an embodiment, the processor 160 may display a preview image using the camera module 110. According to an embodiment, the processor 160 may display the image stored in the memory 120.

In operation 302, the processor 160 may display a plurality of user interfaces corresponding to one or more objects, in the display 130.

In operation 303, the processor 160 may receive a user input to select a user interface among a plurality of user interfaces. According to an embodiment, the processor 160 may receive a user input such as a touch input, or the like.

In operation 304, the processor 160 may obtain an image including one or more objects in a scheme corresponding to the selected user interface. According to an embodiment, the processor 160 may obtain an image in a scheme corresponding to a type of the selected user interface. For example, a type of a user interface may be associated with at least one of QR code recognition, bar code recognition, shopping information search, text extraction, product information search, similar image search, land mark search, scene search, human search, or animal search. According to an embodiment, in the case where a user interface is selected while the processor 160 displays a preview image using the camera module 110, the processor 160 may obtain an image using the camera module 110. For example, the image displayed in the display 130 in operation 301 may be a preview image, and the image obtained in operation 304 may be a high-definition image obtained from the camera module 110. According to an embodiment, in the case where a user interface is selected while the processor 160 displays an image stored in the memory 120, the processor 160 may obtain an image from the image stored in the memory 120. For example, the image displayed in the display 130 in operation 301 may be an original image stored in the memory 120, and the image obtained in operation 304 may be an image cropped from a part of an original image or may be an image, the resolution of which is changed from the original image.

In operation 305, the processor 160 may provide information associated with an object included in the obtained image, based on the selected user interface and the obtained image. According to an embodiment, the processor 160 may display information associated with the object, in the display 130.

Figure 4:
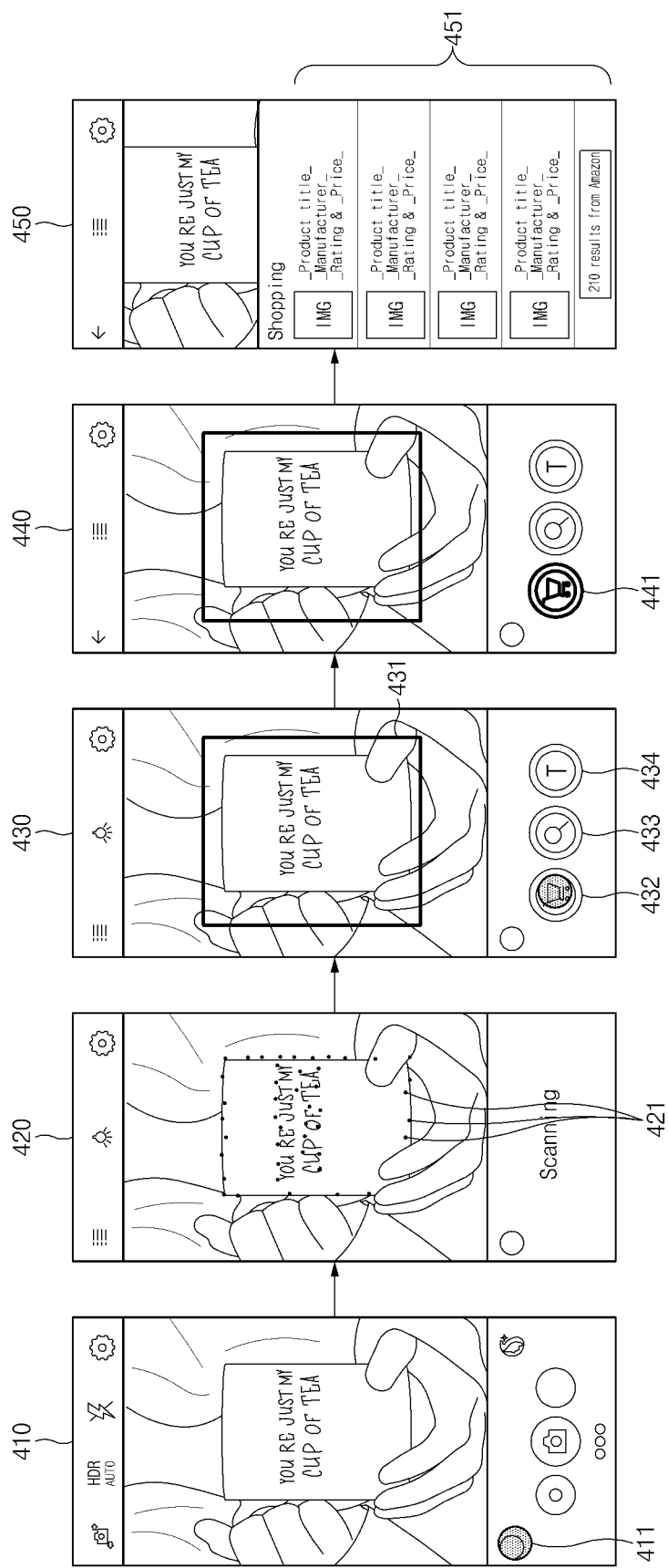
FIG. 4 is a diagram illustrating an example screen in which information associated with an object included in an image is displayed, according to an embodiment.

FIG. 4 is a diagram illustrating an example screen in which information associated with an object included in an image is displayed, according to an embodiment.

Referring to FIG. 4, according to an embodiment, the processor 160 may obtain an image using the camera module 110.

In screen 410, the processor 160 may execute a photo capture application and may receive a touch input to select a user interface 411 for executing an application that provides information associated with an object.

In screen 420, the processor 160 may display a preview image including one or more objects obtained using the camera module 110, in the display (operation 301). In screen 420 according to an embodiment, the preview image may include a cup object and a text object on the surface of the cup. As illustrated in screen 420 according to an embodiment, the processor 160 may display a visual feature effect 421 in the cup and a text that are objects in the preview image.

In screen 430, the processor 160 may display a user interface corresponding to the object in the display (operation 302). In screen 430 according to an embodiment, the processor 160 may display an ROI 431 corresponding to an area including the cup object and a plurality of user interfaces 432, 433, and 434 corresponding to a text object, in the display.

In screen 430, the processor 160 may receive a user input to select one user interface among a plurality of user interfaces (operation 303). In screen 430 according to an embodiment, the processor 160 may receive a touch input to select the shopping information search user interface 432 among the plurality of user interfaces 432, 433, and 434.

If a user input is received, the processor 160 may obtain an image including one or more objects in a scheme corresponding to the user interface selected by the user input (operation 304). According to an embodiment, if a touch input to select the shopping information search user interface 432 is received, the processor 160 may obtain an image including the cup object using the camera module 110 with capture mode settings corresponding to the shopping information search user interface 432. For example, if a touch input to select the text user interface 434 is received, the processor 160 may obtain an image including a text on the surface of the cup, using the camera module 110 with capture mode settings corresponding to the text user interface 434. In other words, the capture mode settings in the case where the touch input to select the shopping information search user interface 432 is received may be different from the capture mode settings in the case where the touch input to select the text user interface 434 is received.

According to an embodiment, as illustrated in screen 440, before providing the information associated with the object, the processor 160 may display the obtained image in a scheme corresponding to the selected user interface. According to an embodiment, as illustrated in screen 440, the processor 160 may display a selected shopping information search user interface 441 so as to be different from the unselected user interface.

In screen 450, the processor 160 may provide the information associated with the object included in an image, based on the user interface and the obtained image (operation 305). According to an embodiment, the processor 160 may use an image including the obtained cup object and may search for shopping information based on the selected shopping information search user interface. As illustrated in screen 450, the processor 160 may display a shopping information search result 451 being information associated with the cup object, in the display 130.

Hereinafter, operation 301 to operation 305 will be described in greater detail.

(2) The Display of an Image and the Display of a User Interface (Operation 301 and Operation 302)

According to an embodiment, in operation 301, the processor 160 may display a preview image including one or more objects using the camera module 110. The processor 160 may receive the preview frame from the camera module 110 and may display the received preview frame in the display 130 in real time.

According to another embodiment, in operation 301, the processor 160 may display an image including one or more objects stored in the memory 120. For example, the image stored in the memory 120 may be an image obtained using the camera module 110, or an image received from the outside, for example, an image downloaded through an Internet browser, an image received through a message, or the like.

According to an embodiment, operation 302 may include an operation in which a frame manager transmits an image to an image recognition engine, an operation in which the image recognition engine recognizes an object and transmits the recognition information to an info manager, and an operation in which the info manager generates additional information about the received recognition information and transmits the additional information to an application and the application displays a user interface.

Hereinafter, an embodiment in which the processor 160 displays a user interface corresponding to an object will be described with reference to FIGS. 5 to 9.

Figure 5:
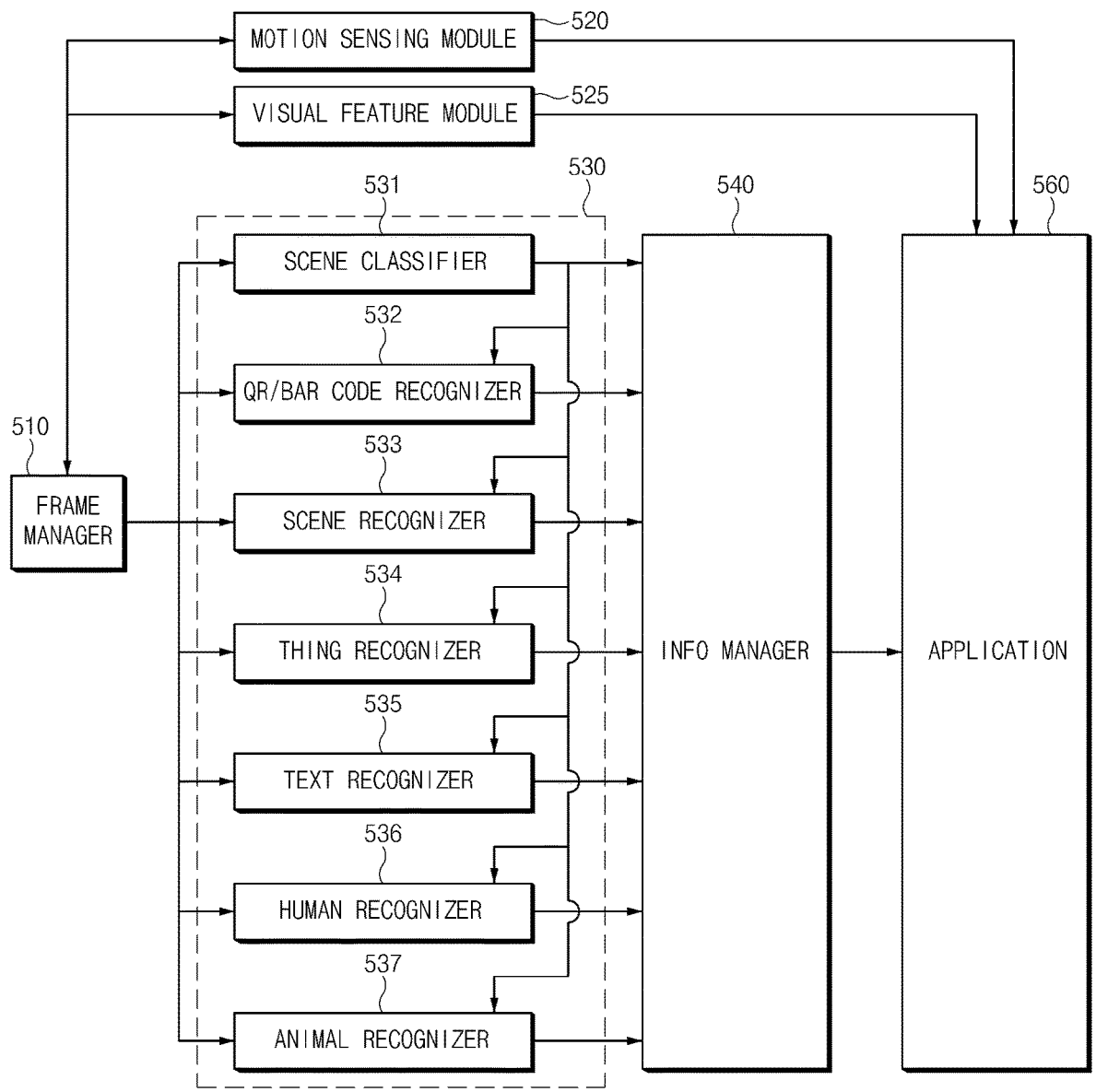
FIG. 5 is a block diagram illustrating example data flow between software modules that a processor includes, according to an embodiment.

FIG. 5 is a block diagram illustrating example data flow between software modules that a processor includes, according to an embodiment.

Referring to FIG. 5, a processor may include a frame manager (e.g., including processing circuitry and/or program elements) 510, a motion sensing module (e.g., including processing circuitry and/or program elements) 520, a visual feature module (e.g., including processing circuitry and/or program elements) 525, an image recognition engine (e.g., including processing circuitry and/or program elements) 530, an info manager (e.g., including processing circuitry and/or program elements) 540, and an application (e.g., including processing circuitry and/or program elements) 560. Accordingly, it is understood that operations performed by modules described below are performed by the processor.

The frame manager 510 may receive a preview image from the camera module 110 or may receive the image stored in the memory 120. In an operation in which the frame manager 510 transmits an image to the image recognition engine 530, the frame manager 510 may change the resolution of the received image to transmit the changed image to the image recognition engine 530. According to an embodiment, the frame manager 510 may determine the resolution of the image to be transmitted, based on the characteristic of the image recognition engine 530. For example, for the purpose of recognizing an object, the frame manager 510 may transmit the original of the received image to a QR/bar code recognizer 532, a scene recognizer 533, and a text recognizer 535, which need a high-definition image, or may transmit the resized image at a high resolution. For the purpose of recognizing the object, the frame manager 510 may transmit the resized image to a scene classifier 531 and a thing recognizer 534, which do not need a high-definition image, at a low resolution.

According to an embodiment, the frame manager 510 may rotate the received image based on information about a tilt state of the electronic device 100 received from the motion sensing module 520 and may transmit the rotated image. According to an embodiment, in the case where the frame manager 510 transmits a preview image, the frame manager 210 may transmit the preview image at a point in time when the motion value of the electronic device 100 is not greater than a preset value, based on motion information received from the motion sensing module 520.

According to an embodiment, in the case where the frame manager 510 receives a preview image from the camera module 110, the frame manager 510 may transmit a frame image to the motion sensing module 520.

The motion sensing module 520 may generate motion information of the electronic device 100 using the image received from the frame manager 510. For example, the motion sensing module 520 may extract the motion vector of a consecutive frame image to generate the motion information. According to another embodiment, the motion sensing module 520 may generate the motion information based on a sensing signal received from the motion sensor of the electronic device 100.

According to an embodiment, the motion sensing module 520 may generate information about the tilt state of the electronic device 100, based on the sensing signal received from a motion sensor of the electronic device 100 and may transmit the information about the tilt state to the frame manager 510. According to an embodiment, the motion information that the motion sensing module 520 generates may be used to determine whether to operate the image recognition engine 530. For example, on the basis of the generated motion information, the image recognition engine 530 may recognize an object in an image in the case where the motion value is not greater than a critical value, and may not operate in the case where the motion value is greater than the critical value.

According to an embodiment, the visual feature module 525 may generate visual feature effect information about an object included in the image using the received image to transmit the visual feature effect information to the application 560. In operation 301 according to an embodiment, the application 560 may apply a visual feature effect to an image (a preview image or an image stored in the memory 120) using the visual feature effect information received from the motion sensing module 520 and may display the image, to which the visual feature effect is applied, in the display 130.

In an operation in which the image recognition engine 530 recognizes an object and transmits the recognized information to the info manager 540, the scene classifier 531, the QR/bar code recognizer 532, the scene recognizer 533, the thing recognizer 534, the text recognizer 535, a human recognizer 536, and an animal recognizer 537 that are included in the image recognition engine 530 may recognize the object depending on each function and may generate ROI information including the recognized object.

According to an embodiment, the QR/bar code recognizer 532, the scene recognizer 533, the thing recognizer 534, the text recognizer 535, the human recognizer 536, and the animal recognizer 537 may detect and recognize an object included in an image depending on each function. According to an embodiment, each of the recognizers may generate the ROI information being information about an area including the object recognized in the image.

According to an embodiment, the image recognition engine 530 may recognize a plurality of objects.

Figure 6:
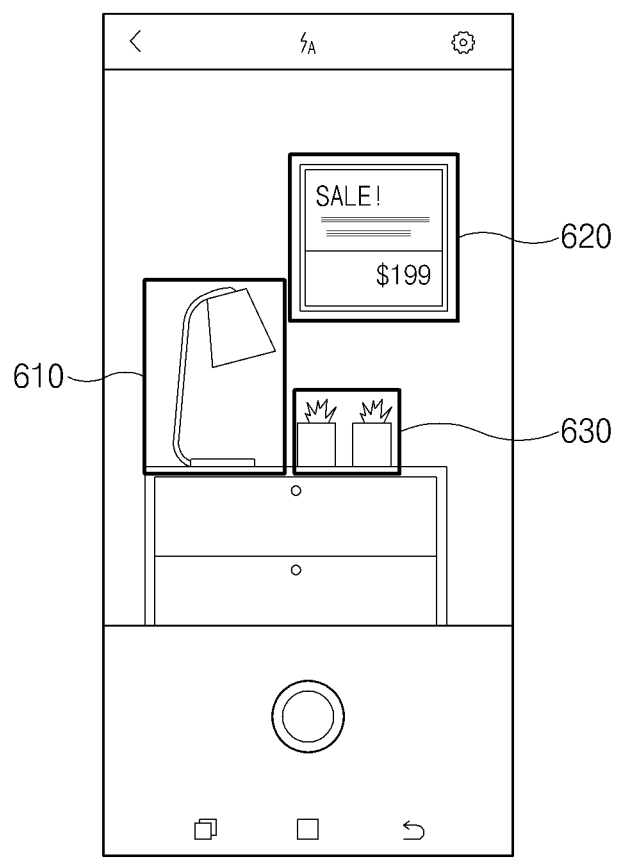
FIG. 6 is a diagram illustrating an object that an image recognition engine recognizes in a preview image and ROI information of the object, according to various embodiments.

FIG. 6 is a diagram illustrating an example object that the image recognition engine 530 recognizes in a preview image and ROI information of the object, according to an embodiment.

As illustrated in FIG. 6, the thing recognizer 534 may recognize a table lamp and a flowerpot corresponding to thing objects in the preview image and may generate ROI information 610 of the table lamp and ROI information 630 of the flowerpot. As illustrated in FIG. 6, the text recognizer 535 may recognize the text of a photo frame corresponding to a text object in the preview image and may generate ROI information 620 of the text. The application 560 to be described below may display the generated ROI information in the display 130.

According to an embodiment, the processor 160 may display a guide interface, the size of which is capable of being adjusted, on the image, and the image recognition engine 530 may recognize an object included in the guide interface. According to an embodiment, the size of the guide interface may be adjusted, or the guide interface may move on the preview image, based on a user input.

Figure 7A:
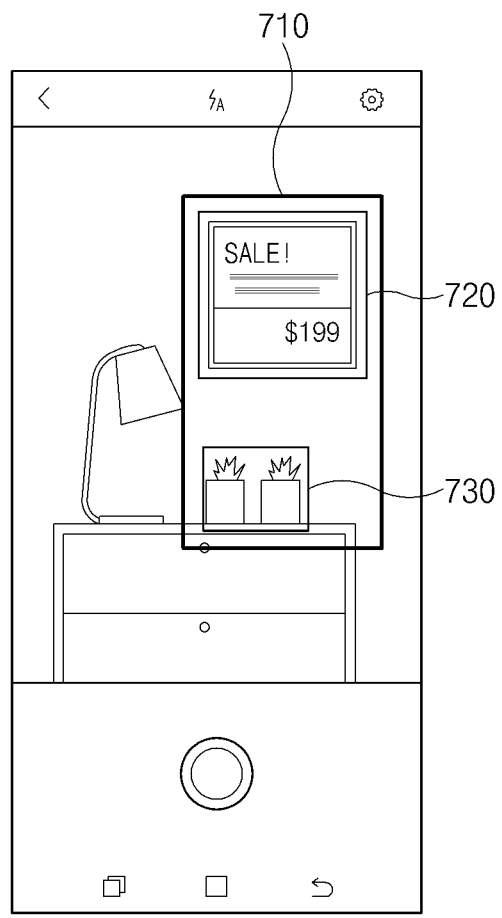
FIG. 7A is a diagram illustrating an example guide interface and ROI information of an object included in the guide interface, according to an embodiment.
Figure 7B:
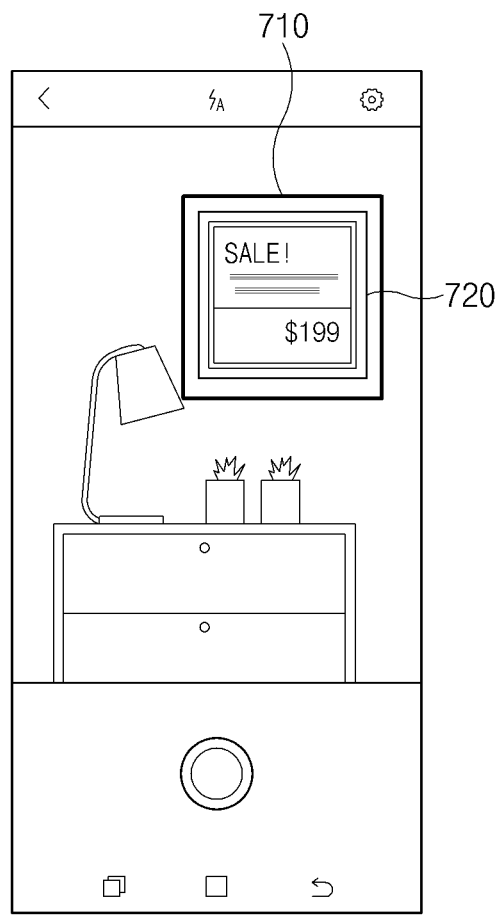
FIG. 7B is a diagram illustrating an example guide interface, a size of which is adjusted, and ROI information of an object included in the guide interface, according to an embodiment.
Figure 7C:
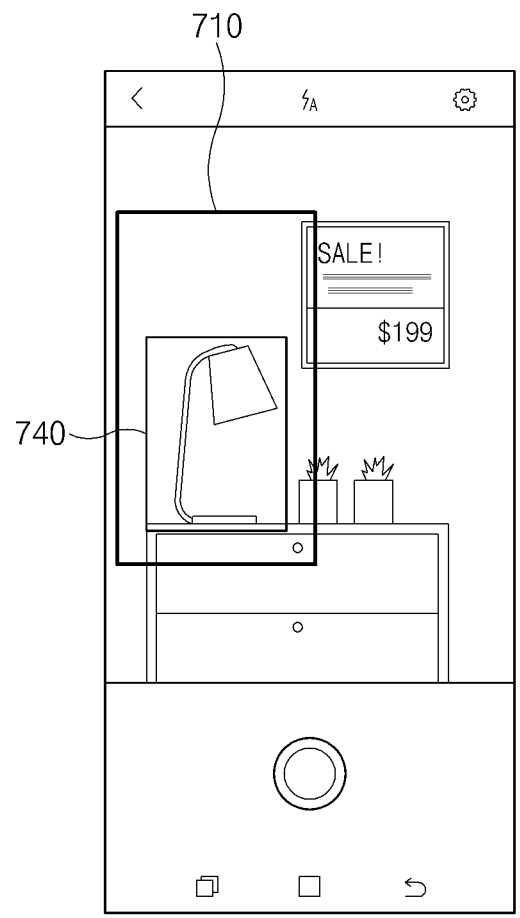
FIG. 7C is a diagram illustrating an example moved guide interface and ROI information of an object included in the guide interface, according to an embodiment.

FIG. 7A is a diagram illustrating an example guide interface and ROI information of an object included in the guide interface, according to an embodiment. FIG. 7B is a diagram illustrating an example guide interface, a size of which is adjusted, and ROI information of an object included in the guide interface, according to an embodiment. FIG. 7C is a diagram illustrating an example moved guide interface and ROI information of an object included in the guide interface, according to an embodiment.

As illustrated in FIG. 7A, the processor 160 may display a guide interface 710 on an image. As illustrated in FIG. 7A, the text recognizer 535 may recognize a text in a photo frame corresponding to a text object included in the guide interface 710 and may generate ROI information 720 of the text. As illustrated in FIG. 7A, the thing recognizer 534 may recognize a flowerpot corresponding to a thing object included in the guide interface 710 and may generate ROI information 730 of the flowerpot.

As illustrated in FIG. 7B, the size of the guide interface 710 may be adjusted. Referring to FIG. 7B, the object included in the guide interface 710, the size of which is adjusted may be a photo frame. According to an embodiment based at least on FIG. 7B, a table lamp and a flowerpot may not be recognized and only the photo frame may be recognized. According to an embodiment based at least on FIG. 7B, only the recognition result of the photo frame may be used (e.g., the recognition result of the table lamp and the flowerpot is not used) in the recognition result in which the photo frame, the table lamp, and the flowerpot are recognized. As illustrated in FIG. 7B, the text recognizer 535 may recognize a text in a photo frame corresponding to a text object included in the guide interface 710 and may generate ROI information 720 of the text.

As illustrated in FIG. 7C, the guide interface 710 may move. Referring to FIG. 7C, since an object included in the moved guide interface 710 is a table lamp, a text, and a flowerpot in a photo frame may not be recognized.

According to an embodiment based at least on FIG. 7C, a text and a flowerpot may not be recognized and only a table lamp may be recognized. According to an embodiment based at least on FIG. 7C, only the recognition result of the table lamp may be used (e.g., the recognition result of the text and the flowerpot is not used) in the recognition result in which a text, a flowerpot, and a table lamp are recognized. As illustrated in FIG. 7C, the thing recognizer 534 may recognize a table lamp corresponding to a thing object included in the guide interface 710 and may generate ROI information 740 of the table lamp.

According to an embodiment, the processor 160 may receive a user input to select an object, and the image recognition engine 530 may recognize the selected object. For example, the user input may be a touch input, a gesture input such as a zoom-in or the like, a force touch input, or the like.

According to an embodiment, the image recognition engine 530 activated by settings may recognize an object.

Figure 8:
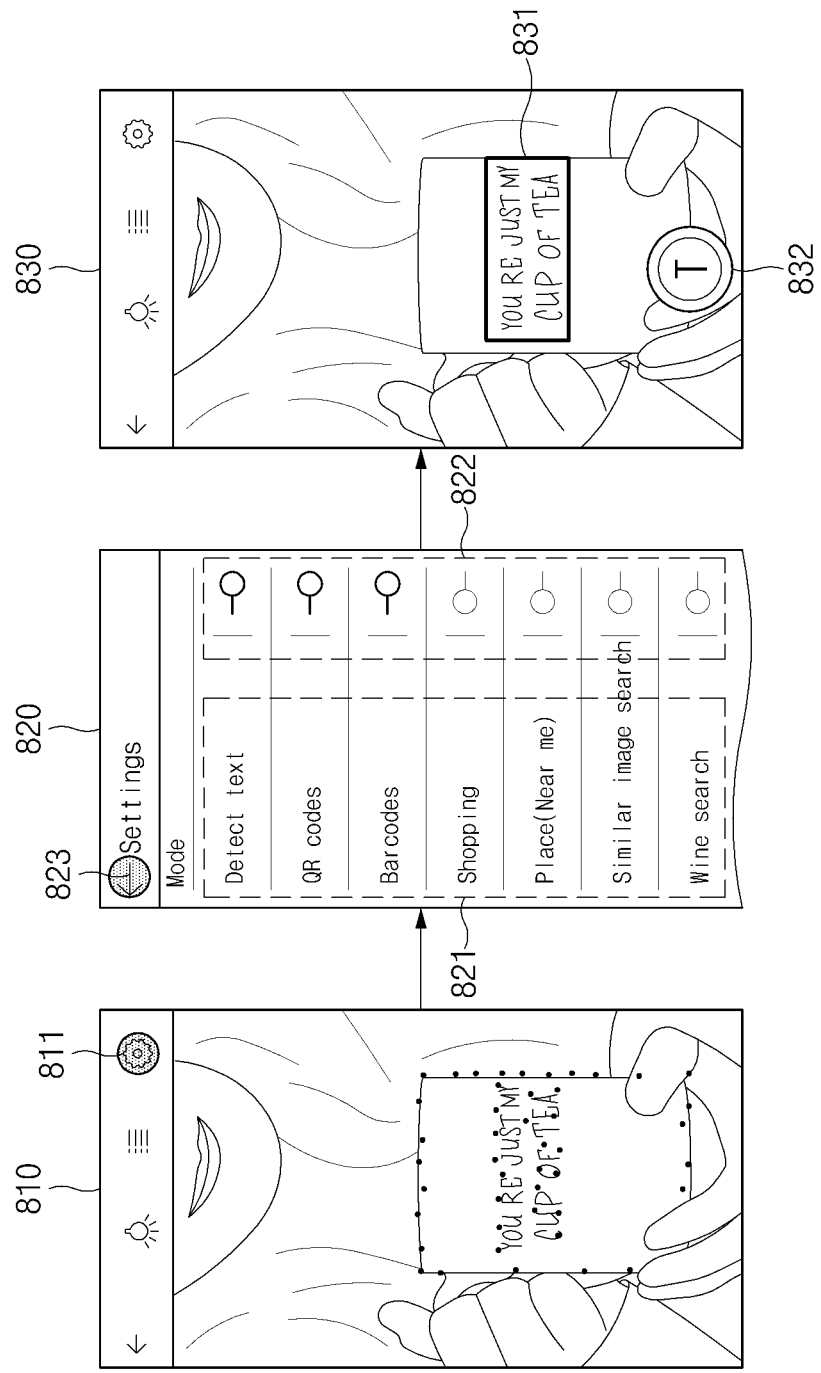
FIG. 8 is a diagram illustrating a screen in which setting information is determined by a user input and the image recognition engine activated by the setting information recognizes an object, according to an embodiment.

FIG. 8 is a diagram illustrating an example screen in which setting information is determined by a user input and the image recognition engine 530 activated by the setting information recognizes an object, according to an embodiment.

Referring to screen 810, the application 560 may display a preview image and may include a UI 811 for settings associated with function activation. If the application 560 receives a user input to select the UI 811 for the settings associated with the activation of the image recognition engine 530, setting screen 820 may be displayed.

Referring to screen 820, the application 560 may include names 821 of a plurality of functions to be activated, a UI 822 indicating whether to activate the functions, and a UI 823 that gets out of the setting screen. According to an embodiment, some function of the plurality of functions may be activated depending on a user input. The processor 160 may determine whether to activate the image recognition engine 530, based on the activated function. For example, referring to screen 820, only a function to detect a text, a QR code, and a bar code may be activated. The processor 160 may activate only both the QR/bar code recognizer 532 and the text recognizer 535, based on the activated function.

If the processor 160 receives a user input to select the UI 823 that gets out of the setting screen, screen 830 may be displayed in the display 130.

Referring to screen 830, the processor 160 may perform an operation in which the activated QR/bar code recognizer 532 and the activated text recognizer 535 recognize an object, and the text recognizer 535 may recognize a text on the surface of a cup corresponding to a text object to generate ROI information 831 of the text. According to an embodiment, the processor 160 may display a user interface 832 for providing a function associated with the recognized text, in the display 130, and details about the user interface for providing the function will be described below.

According to an embodiment, as illustrated in FIG. 5, a plurality of recognizers may receive information that the scene classifier 531 generates, and only some recognizer among the plurality of recognizers may be activated based on the generated information.

For example, in the case where the scene classifier 531 generates information about the fact that a type of an image is a document, the scene recognizer 533 and the thing recognizer 534 may be deactivated based on the generated information, and the QR/bar code recognizer 532 and the text recognizer 535 may be activated.

According to various embodiments, the frame manager 510 may transmit an image to the scene classifier 531 at first, and only the recognizer activated based on the information that the scene classifier 531 generates may receive an image.

According to an embodiment, the image stored in the memory 120 may include information about an image generated by an image classifier or a VI agent. A recognizer, which corresponds to information about an object included in an image, from among a plurality of recognizers may be deactivated. For example, a text may be included in an image stored in the memory 120, and the image may include text information generated by an optical character reader (OCR). In this case, the text recognizer 535 corresponding to the text information stored in advance may be deactivated.

According to an embodiment, in the case where the image recognition engine 530 recognizes an object in a preview image from the camera module 110, the image recognition engine 530 may not recognize an object for each preview frame, may recognize the object in at least one preview frame, and may track the recognized object. According to an embodiment, when tracking the object in the preview frame, the image recognition engine 530 may continue the tracking until a motion value that the motion sensing module 520 generates exceeds a critical value. According to an embodiment, the image recognition engine 530 may continue object tracking until the detected object gets out of an image.

According to various embodiments, in the case where the processor 160 provides information associated with an object included in a preview image using the camera module 110, the image recognition engine 530 may perform only an operation of detecting the object, other than an operation of recognizing the object. Unlike this, in the case where the processor 160 provides information associated with the object included in the image stored in the memory 120, the image recognition engine 530 may perform both the operation of detecting the object and the operation of recognizing the object.

In an operation in which the application 560 displays a user interface, the application 560 may display a plurality of user interfaces. For example, the application 560 may display a plurality of user interfaces corresponding to one object or may display a plurality of user interfaces corresponding to a plurality of objects. According to an embodiment, the application 560 may display the user interface corresponding to the object selected by a user input.

According to an embodiment, the processor 160 may determine an attribution corresponding to the object and may display a user interface based on the determined attribution. For example, the attribution corresponding to the object may be a type of the object such as a text, a thing, a human, an animal, a scene, a QR code, or a bar code. According to an embodiment, in the case where the processor 160 determines that the attribution corresponding to the object is a thing, the processor 160 may display at least one of a user interface for searching for shopping information or a user interface for searching for a similar image.

According to an embodiment, in the case where the processor 160 recognizes a plurality of types of objects, the processor 160 may display a user interface corresponding to a type, which is determined based on a preset priority, from among the plurality of types. For example, the preset priority may have the order of the QR code, the bar code, the text, the thing, the human, the animal, and the scene. In the case where the processor 160 recognizes a QR code object, a text object, and a scene object, the processor 160 may determine that the QR code object is ranked as the first priority, that the text object is ranked as the second priority, and that the scene object is ranked as the third priority, based on the preset priority.

According to an embodiment, the processor 160 may display only a user interface corresponding to the QR code corresponding to the first priority, in the display 130. According to an embodiment, the processor 160 may display all the user interfaces respectively corresponding to the QR code object, the text object, and the scene object and may display the user interfaces in order of the user interface for interpreting a QR code, the user interface for extracting a text, and the user interface for searching for information about a scene, based on the priority.

According to an embodiment, the processor 160 may display at least one attribution information corresponding to the determined attribution in the display 130 in association with the object. According to an embodiment, the attribution information may be associated with the recognized object or may be a function capable of being provided. For example, the attribution information may be product search, text extraction, place search, or the like.

Figure 9:
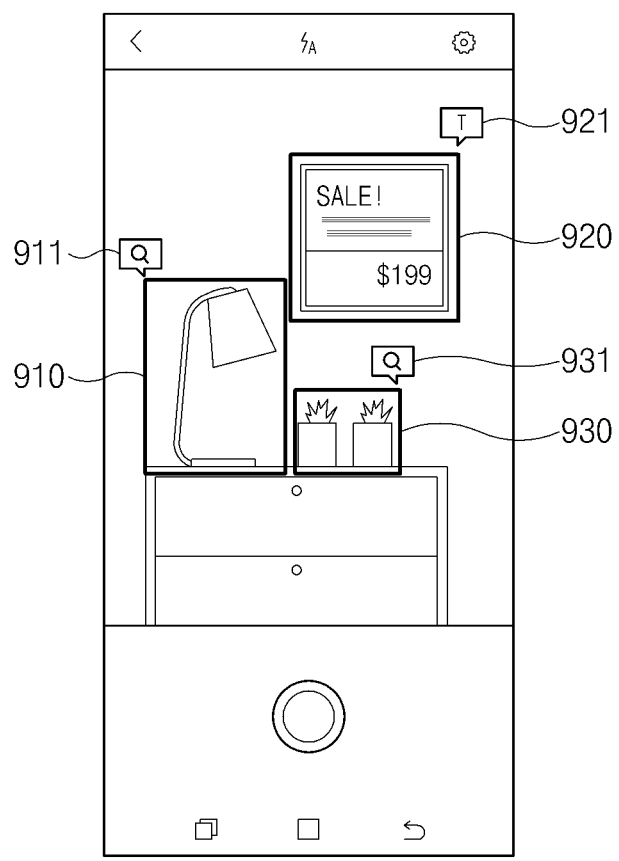
FIG. 9 is a diagram illustrating an example screen in which user interfaces corresponding to a plurality of objects are displayed in association with an object, according to an embodiment.

FIG. 9 is a diagram illustrating an example screen in which user interfaces corresponding to a plurality of objects are displayed in association with an object, according to an embodiment.

Referring to FIG. 9, the processor 160 may display ROI information 910 including a table lamp recognized in an image, ROI information 920 including a text in a photo frame, and ROI information 930 including a flowerpot, in the display 130. Referring to FIG. 9, the processor 160 may display a user interface 911 for searching for a similar image at a periphery of the ROI information 910 including the table lamp, may display a user interface 921 for extracting a text at a periphery of the ROI information 920 including the text in the photo frame, and a user interface 931 for searching for a similar image at a periphery of the ROI information 930 including the flowerpot. The processor 160 may display user interfaces corresponding to a plurality of objects in association with the objects, by displaying a user interface corresponding to each object at a periphery of ROI information of each object.

According to an embodiment, the processor 160 may determine a user interface to be displayed, based on context information. For example, the context information may include a current time, a location of the electronic device 100, a user input history, or the like.

For example, in the case where the electronic device 100 is located in a department store and the processor 160 recognizes a thing object, the processor 160 may display a user interface for searching for product information based on information about the fact that the electronic device 100 is placed at a department store.

For another example, the memory 120 may store a user input history. According to the user input history of an embodiment, the number of user inputs for selecting a user interface for searching for a similar image among a plurality of types of user interfaces may be greater than the number of user inputs for selecting other types of user interfaces. The processor 160 may determine that a user interface for searching for a similar image among a plurality of user interfaces corresponding to the recognized object is a representative user interface, based on the user input history and may display the representative user interface.

According to an embodiment, the number of user interfaces corresponding to one object is plural, and only the representative user interface among the plurality of user interfaces may be displayed in the display 130. At this time, in the case where the processor 160 receives a preset user input, the processor 160 may perform an operation of displaying all the plurality of user interfaces corresponding to the one object in the display 130. According to an embodiment, the preset user input may be a user input to touch a user interface displayed in the display 130 during a specific time or more or a user input (e.g., a force touch) to touch the user interface with the pressure of specific strength or more.

According to an embodiment, in the case where the processor 160 recognizes an object included in an image stored in the memory 120 and the memory 120 stores category information associated with the object included in the image, the processor 160 may display a user interface based on the category information.

For example, the processor 160 may display only the user interface, which corresponds to an object in which the category information is stored, from among the recognized plurality of objects. According to an embodiment, in the case where a table lamp, a flowerpot, and a text are included in an image and the category information about the fact that an image includes the text corresponding to the category information is stored in the memory 120, the processor 160 may display only a user interface corresponding to a text object.

(3) The Reception of a User Input to Select a User Interface and the Acquisition of an Image (Operation 303 and Operation 304)

In operation 303, the processor 160 may receive a user input to select a user interface displayed in the display 130. For example, the user input may be a touch input or the like.

If the user input to select the user interface in operation 303, in operation 304, the processor 160 may obtain an image in a scheme based on the selected user interface or the like. According to an embodiment, the obtained image may be stored in the memory 120.

According to an embodiment, in the case where the processor 160 receives a user input associated with a user interface corresponding to an object included in the preview image obtained using the camera module 110, the scheme may include capture mode settings to obtain an image using the camera module 110. For example, the capture mode setting may include at least one of a flash operation setting, a resolution setting of an image, a zoom setting, an ISO setting, an exposure setting, an aperture setting, or a high dynamic range (HDR) mode setting.

According to an embodiment, the processor 160 may receive a user input associated with a user interface corresponding to an object included in the image, using the image stored in the memory 120. In this case, for example, the scheme may include a scheme to obtain an image from a partial area including one or more objects in the image stored in the memory 120 or a scheme to obtain an image at a specified resolution.

According to an embodiment, in the case where the selected user interface is a user interface for extracting a text, the processor 160 may obtain an image using the camera module 110 with a capture mode setting to obtain a high-resolution image. For another example, the processor 160 may obtain an image of the highest quality among the images stored in the ring buffer of the camera module 110.

According to an embodiment, in the case where the processor 160 uses the image stored in the memory 120 and the selected user interface is the user interface for extracting a text, the processor 160 may not reduce the resolution of the image stored in the memory 120 (or a specified resolution or more) and may crop a partial area including a text in the image to obtain the image. In other words, the processor 160 may obtain the image by cropping a part, other than the partial area including a text, in the image stored in the memory 120.

According to an embodiment, in the case where the selected user interface is a user interface for searching for place information of a scene, the processor 160 may obtain an image using the camera module 110 with a capture mode setting to obtain a low-resolution image or may obtain a preview image.

In other words, the processor 160 may determine the quality of the obtained image, an image obtaining method, or the like, based on a type of the selected user interface.

According to an embodiment, the processor 160 may obtain an image in a scheme that is based on an object included in an image. For example, when the processor 160 receives a user input to select a user interface to obtain an image, in the case where a complex pattern is included in an object included in the image, the processor 160 may obtain an image using the camera module 110 with a capture mode setting to obtain a high-resolution image. For another example, in the case where the object included in the preview image is dark, the processor 160 may obtain an image in a capture mode setting to operate a flash.

According to an embodiment, the processor 160 may obtain an image in a scheme corresponding to one attribution information, which is determined based on context information, from among pieces of attribution information corresponding to the object. For example, the context information may include a user input history, a location of the electronic device 100, a current time, or the like. The attribution information may be information about a function provided in association with an object, and the provided function may include text extraction, translation, similar image search, shopping information search, QR code recognition, place information search, or the like.

For example, the attribution information corresponding to the object may be a text extraction function or a translation function, and a history in which a translation function execution input is received more than a specific frequency or more may be included in a user input history. The processor 160 may determine that the translation function is the attribution information corresponding to the object, based on the history in which an execution input of the translation function among the text extraction function and the translation function is received more than the specific frequency or more, and may obtain an image in a scheme corresponding to the translation function. For example, since the processor 160 needs to extract a text for the purpose of executing the translation function, the processor 160 may obtain an image using the camera module 110 with a capture mode setting to obtain a high-resolution image.

According to an embodiment, the processor 160 may obtain an image in a scheme that is based on category information of an image determined by a scene classifier.

Figure 10:
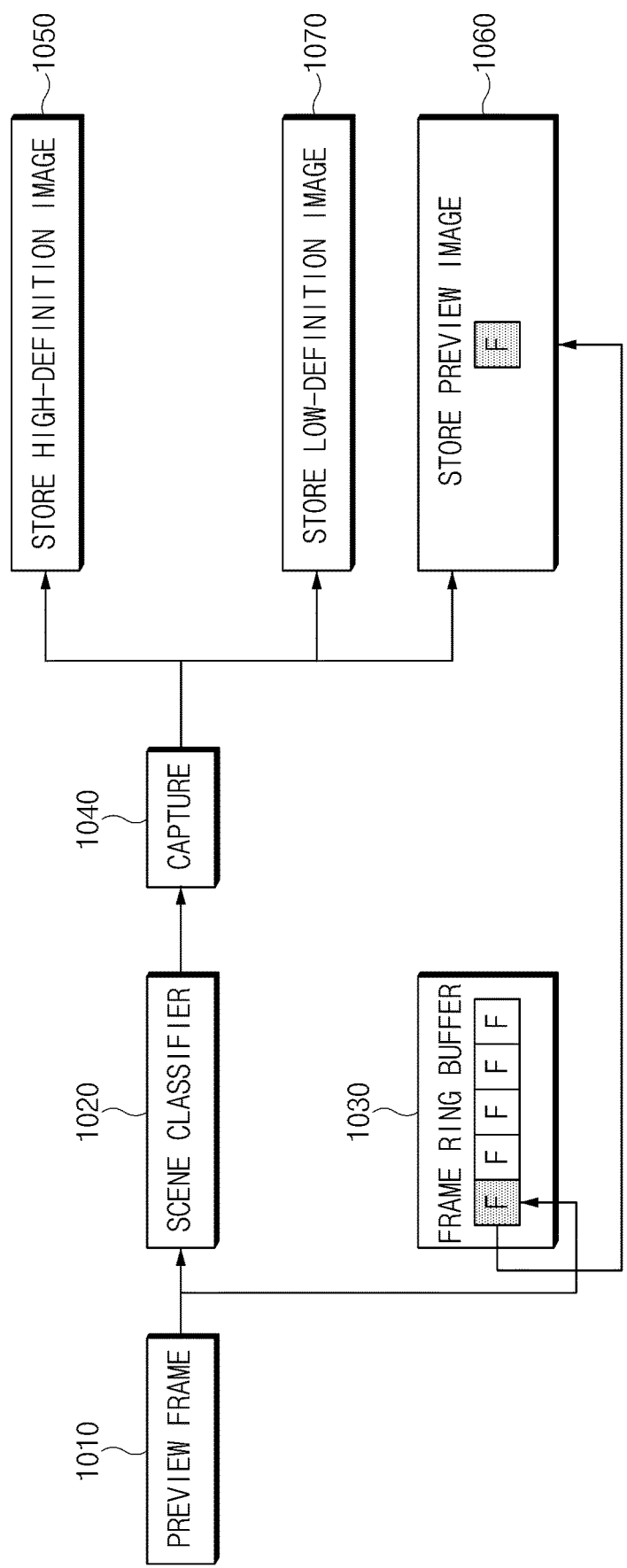
FIG. 10 is a block diagram illustrating and example of how a quality of an image that a processor obtains is determined based on category information of an image determined by a scene classifier, according to an embodiment.

FIG. 10 is a block diagram illustrating an example of how a quality of an image that the processor 160 obtains is determined based on category information of an image determined by a scene classifier, according to an embodiment.

Referring to FIG. 10, a preview frame 1010 may be transmitted to a scene classifier 1020 and may be stored in a frame ring buffer 1030. The scene classifier 1020 may determine the category of a preview image using the preview frame 1010. If the processor 160 receives a user input to select a user interface, the processor 160 may capture (e.g., obtain) an image using the camera module 110 (1040). According to an embodiment, in the case where the category of the preview image that the scene classifier 1020 determines is a document, the processor 160 may obtain a high-definition image using the camera module 110 and may store the high-definition image (1050). According to an embodiment, in the case where the category of a preview image that the scene classifier 1020 determines is not a document, the processor 160 may receive and store the preview image stored in the frame ring buffer 1030 or may obtain a low-definition image using the camera module 110 to store the low-definition image (1070). According to an embodiment, the frame ring buffer 1030 may store a plurality of preview frames (1060), and the processor 160 may receive and store the highest definition frame image (e.g., the frame image with the least blur) among the plurality of preview images.

(4) The Providing of Information Associated with an Object (Operation 305)

In operation 305, the processor 160 may provide information associated with an object based on the selected user interface and the obtained image.

According to an embodiment, in the case where the processor 160 recognizes a text object and receives a user input to select a user interface for text extraction, after extracting a text, the processor 160 may further display a user interface associated with the extracted text. For example, the processor 160 may display a user interface for a note or a memo, a user interface for storage and sharing, a user interface for translation, and a user interface for search.

In the case where the processor 160 receives a user input to select the user interface for a note or a memo, the processor 160 may execute an application for text writing and may enter the extracted text in a text writing area. The processor 160 may store the extracted text in the memory 120. In the case where the processor 160 receives a user input to select the user interface for storage and sharing, the processor 160 may display the extracted text on a screen and may provide a UI for storage and sharing. In the case where the processor 160 receives a user input to select the user interface for translation, the processor 160 may transmit a text and a translation request query to an external server and may receive the translated text from the external server to provide the translated text. In the case where the processor 160 receives a user input to select the user interface for search, the processor 160 may transmit a text and a search request query to the external server and may receive the search result from the external server to provide the search result. According to an embodiment, in the case where the processor 160 recognizes that an image including a text object is a business card and receives a user input to select a user interface for storing a contact list, the processor 160 may extract a text included in an image and may provide a service to store the contact list.

According to an embodiment, in the case where the processor 160 recognizes a QR code object and receives a user input to select a user interface for recognizing the QR code, the processor 160 may extract and provide information defined in the QR code. According to an embodiment, the processor 160 may further provide a service according to the extracted information.

According to an embodiment, in the case where the processor 160 recognizes a bar code object and selects a user interface for searching for shopping information, the processor 160 may transmit a query to search for the shopping information and bar code information to a shopping mall server and may receive shopping information (e.g., similar product recommendation information, information for moving to a purchase site to guide purchasing) from the shopping mall server to provide the shopping information.

According to an embodiment, in the case where the processor 160 recognizes a scene object and selects a user interface for searching for land mark information, the processor 160 may transmit an image and a query to search for the land mark information search, to an external server and may receive the land mark information from the external server to provide the land mark information.

According to an embodiment, in the case where the processor 160 recognizes a thing object and receives a user input to select a user interface for search, the processor 160 may search for a similar image in the image stored in the memory 120 to provide the found similar image or may transmit an image and a query to search for the similar image to the external server and may receive the similar image from the external server to provide the similar image. For another example, in the case where a user interface for searching for the shopping information is selected, the processor 160 may transmit an image and a query to search for product information to a shopping mall server and may receive the product information from the shopping mall server to provide the product information.

According to an embodiment, the processor 160 may change the resolution of the obtained image based on an object and may provide information associated with the object based on the selected user interface and the image, the resolution of which is changed. For example, in the case where the object is a scene, the processor 160 may lower the resolution of the obtained image. In the case where the selected user interface is a user interface for searching for place information, the processor 160 may search for the place information using an image, the resolution of which is lowered, and may provide the found place information. According to an embodiment, on the basis of at least one of the selected user interface or one or more objects, the processor 160 may provide information associated with an object based on information stored in the memory 120 or may transmit at least one of the image obtained using the communication circuit 150 or information obtained from the obtained image, to the external server and may receive the information associated with the object from the external server to provide the information associated with the object. In other words, for the purpose of providing the information associated with the object, the processor 160 may determine whether to use a first database stored in the memory 120 or whether to use a second database stored in the external server.

For example, in the case where the selected user interface is a user interface for text extraction, the processor 160 may extract and provide a text based on OCR information stored in the memory 120. On the other hand, in the case where the selected user interface is a user interface for translation, the processor 160 may obtain a text included in an image and may transmit a text and a translation request query to a translation server.

According to an embodiment, even though the selected user interface is a user interface for text extraction, in the case where an amount of text included in an image exceeds a preset standard, the processor 160 may transmit an image and a text extraction request query to an external OCR processing server and may receive and provide the extracted text.

According to an embodiment, before extracting the text, the processor 160 may perform an operation of rotating an image, removing a noise, adjusting an ROI area, or the like.

The processor 160 may determine the category of the extracted text (e.g., a receipt, a schedule, or a business card) or may provide a service to edit, store, and share the translated text, to recognize a business card, to store a contact list, to calculate a math problem, or the like. The processor 160 may store the extracted text for each similar content.

Figure 11:
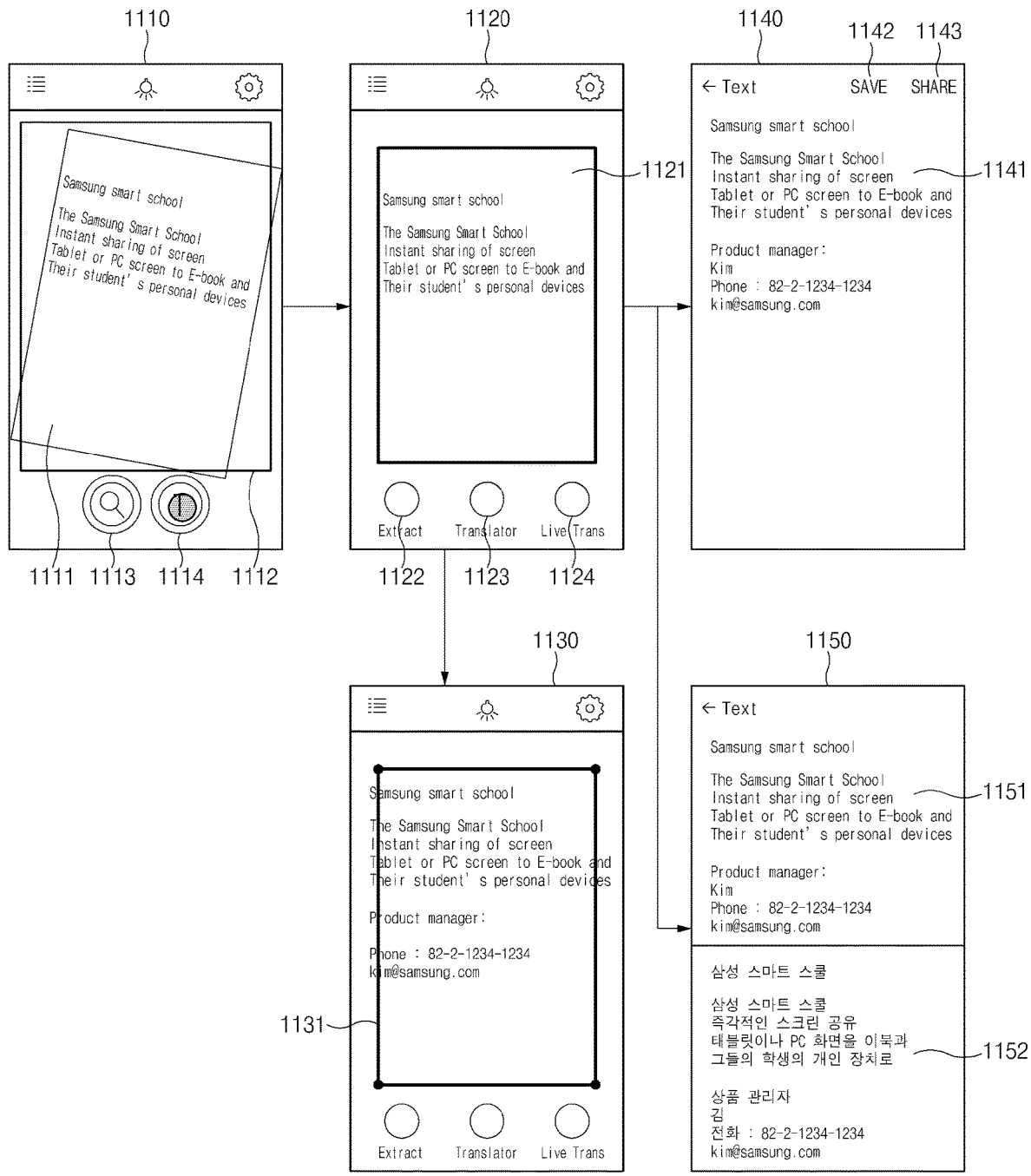
FIG. 11 is a diagram illustrating an example screen in which a text included in an image is extracted to provide information associated with a text, according to an embodiment.

FIG. 11 is a diagram illustrating an example screen in which a text included in an image is extracted to provide information associated with a text, according to an embodiment.

In screen 1110, the processor 160 may display a preview image in which a text is included, in the display 130 using the camera module 110. The processor 160 may display ROI information 1112 of a text object 1111, a user interface 1113 for search corresponding to a text object, and a user interface 1114 associated with the text. The processor 160 may receive a user input to select the user interface 1114 for text extraction and may display screen 1120 depending on the reception of the user input.

According to an embodiment, the processor 160 may display a text object 1121 illustrated in screen 1120 by rotating the text object 1111, and may display additional user interfaces 1122, 1123, and 1124 corresponding to a text object.

According to an embodiment, in screen 1120, the processor 160 may receive a user input to enlarge a screen and, as illustrated in screen 1130, may adjust an ROI area 1131.

According to an embodiment, the processor 160 may receive a user input to select the user interface 1122 for text extraction and, as illustrated in screen 1140, may provide an extracted text 1141. According to an embodiment, in screen 1140, the processor 160 may display a UI 1142 for storing the extracted text and a UI 1143 for sharing the extracted text.

According to an embodiment, the processor 160 may receive a user input to select the user interface 1123 for translation and, as illustrated in screen 1150, may provide an extracted text 1151 and a translated text 1152.

Figure 12A:
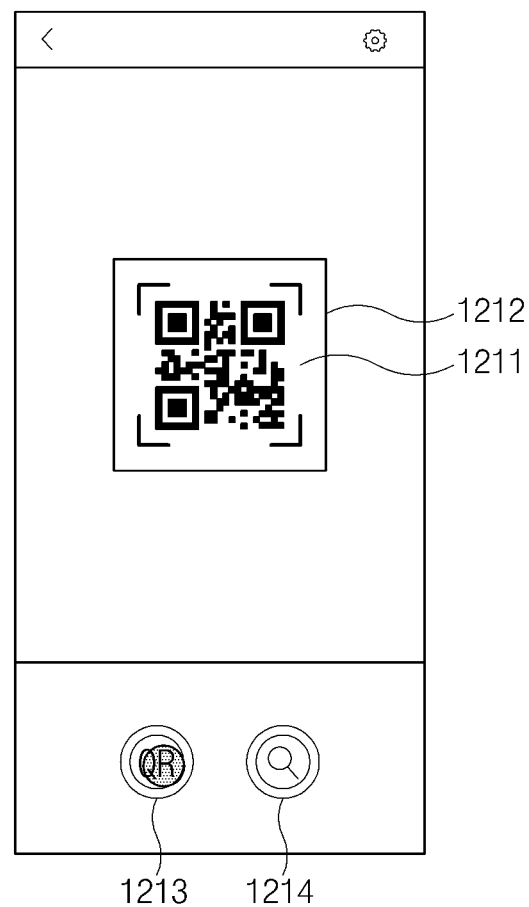
FIG. 12A is a diagram illustrating an example screen in which a QR code in a preview image is recognized and a user interface corresponding to a QR code is displayed, according to an embodiment.
Figure 12B:
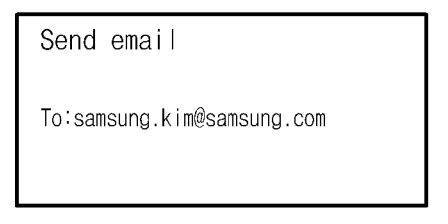
Figure 12D:
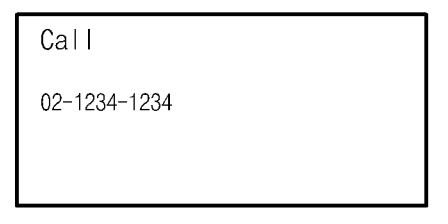

FIG. 12A is a diagram illustrating an example screen in which a QR code in a preview image is recognized and a user interface corresponding to a QR code is displayed, according to an embodiment. FIGS. 12B, 12C and 12D are diagrams illustrating information defined in a QR code, according to various embodiments.

Referring to FIG. 12A, the processor 160 may display ROI information 1212 including a QR code 1211 recognized in an image, a user interface 1213 for extracting the information defined in the QR code, and a user interface 1214 for searching for the QR code, in the display 130. If the processor 160 receives a user input to select the user interface 1213 for extracting the information defined in the QR code, the processor 160 may provide the information defined in the QR code as illustrated in FIGS. 12B, 12C and 12D. For example, in the case where the processor 160 displays information, as illustrated in FIG. 12B, in the display 130 and obtains a touch input corresponding to the displayed information, the processor 160 may perform an application of transmitting e-mail with samsung.kim@samsung.com as the recipient. In the case where the processor 160 displays information, as illustrated in FIG. 12C, in the display 130 and obtains a touch input corresponding to the displayed information, the processor 160 may perform an application of adding a workshop schedule at Yangjae on Sep. 22, 2016. In the case where the processor 160 displays information, as illustrated in FIG. 12D, in the display 130 and obtains a touch input corresponding to the displayed information, the processor 160 may perform an application of dialing 02-1234-1234.

Figure 13:
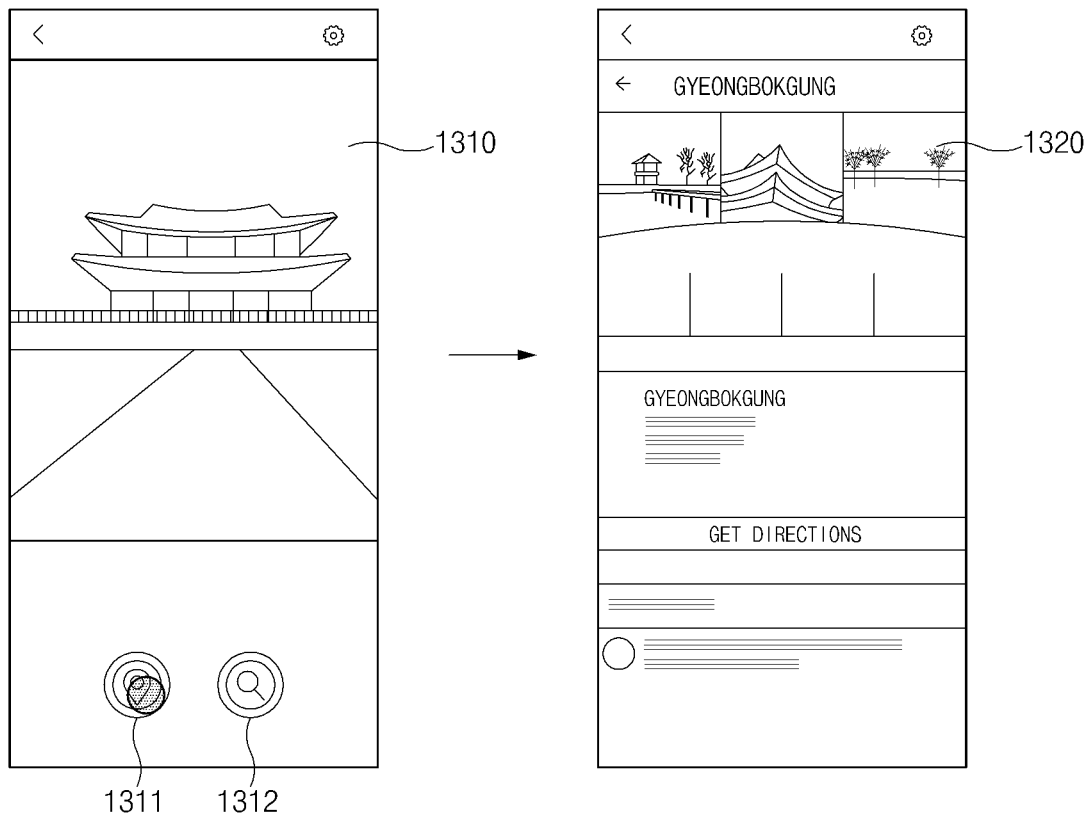
FIG. 13 is a diagram illustrating an example screen in which a scene included in a preview image is recognized, and a land mark information search result screen, according to an embodiment.

FIG. 13 is a diagram illustrating an example screen in which a scene included in a preview image is recognized, and a land mark information search result screen, according to an embodiment.

Referring to screen 1310, the processor 160 may display a user interface 1311 for searching for land mark information corresponding to a scene object recognized in an image and a user interface 1312 for searching for a similar image, in the display 130. If the processor 160 receives a user input to select the user interface 1311 for searching for the land mark information, the processor 160 may transmit a query to search for the land mark information and the obtained image to an external server and may receive the land mark information from the external server to provide the received information as illustrated in screen 1320.

Figure 14:
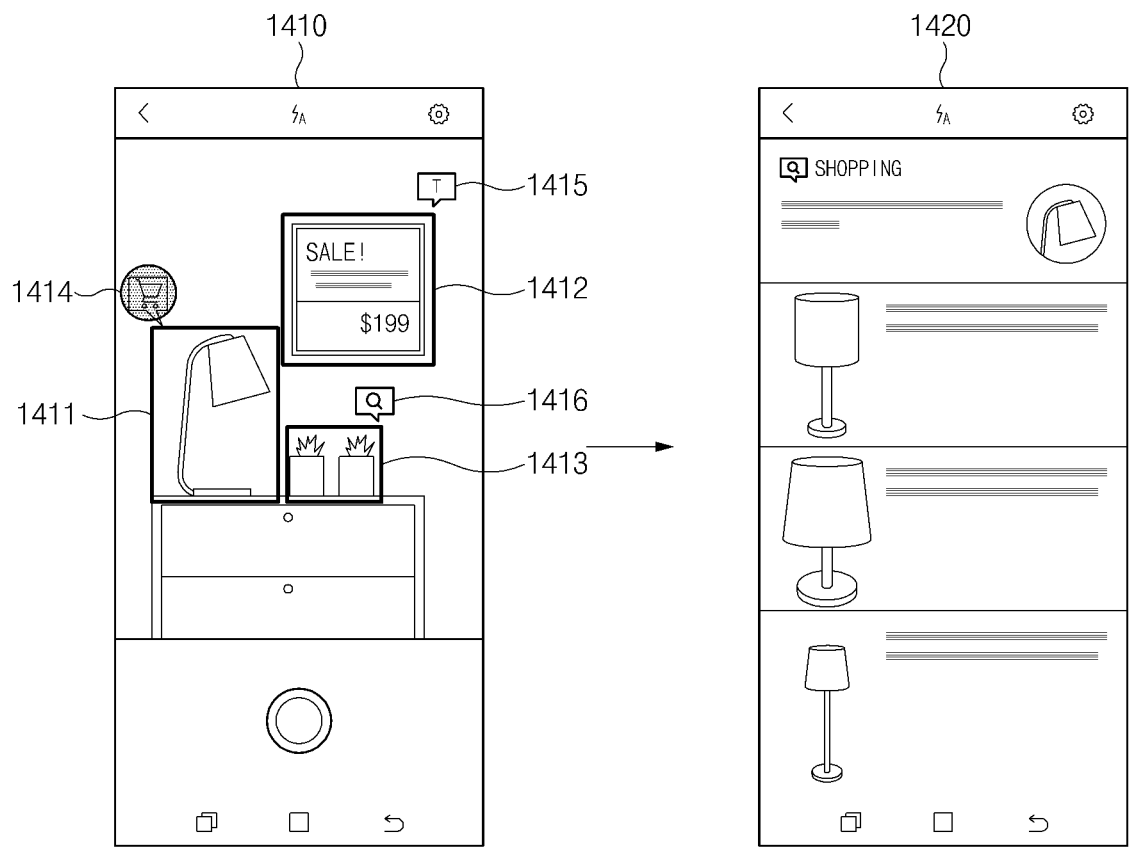
FIG. 14 is a diagram illustrating an example screen in which a plurality of objects and a plurality of user interfaces are displayed in an image and a product information search result screen, according to an embodiment.

FIG. 14 is a diagram illustrating an example screen in which a plurality of objects and a plurality of user interfaces are displayed in an image and a product information search result screen, according to an embodiment.

Referring to screen 1410, the processor 160 may display ROI information 1411 including a table lamp recognized in an image, ROI information 1412 including a text in a photo frame, ROI information 1413 including a flowerpot, a user interface 1414 for searching for a product, a user interface 1415 for extracting a text, and a user interface 1416 for searching for a similar image, in the display 130. If the processor 160 receives a user input to select the user interface 1414 for searching for a product, the processor 160 may transmit a query to search for product information of a table lamp and the obtained image to an external server and may receive the product information from the external server to provide the received information as illustrated in screen 1420.

Figure 15:
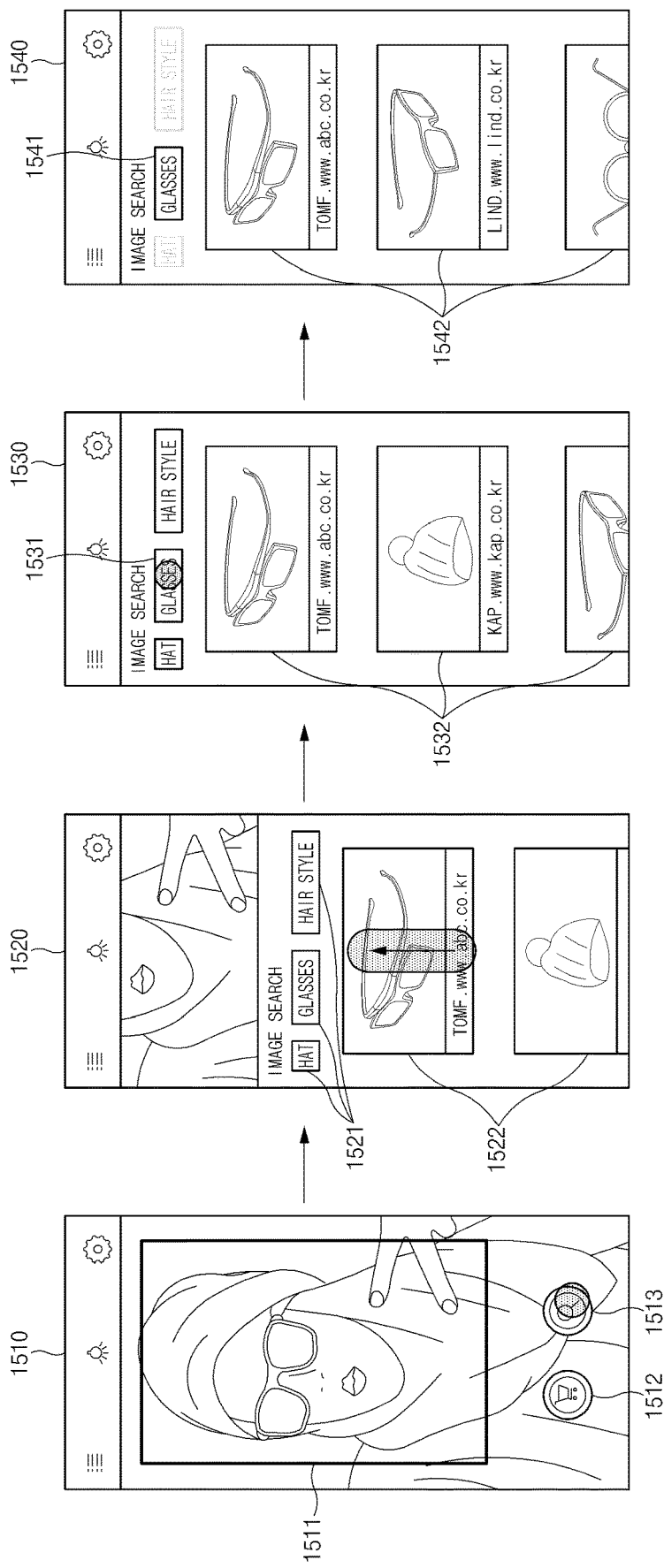
FIG. 15 is a diagram illustrating and example of how a product information search result is filtered and displayed based on a keyword, according to an embodiment.

FIG. 15 is a diagram illustrating an example of how a product information search result is filtered and displayed based on a keyword, according to an embodiment.

In screen 1510, the processor 160 may recognize hats, glasses, and hairstyles in an image and may display ROI information 1511 including the recognized object, a user interface 1512 for searching for shopping information, and a user interface 1513 for searching for an image. If the processor 160 receives a user input to select the user interface 1513 for searching for a similar image, the processor 160 may transmit a query to search for product information of hats, glasses, and hairstyles and the obtained image to an external server and may receive the product information from the external server to provide the received information as illustrated in screen 1520.

In screen 1520, the processor 160 may display keywords 1521 corresponding to a plurality of objects and product information 1522 corresponding to the plurality of objects. The processor 160 may receive an input for scrolling upward and may scroll a screen to display more pieces of product information 1532 as illustrated in screen 1530, compared with screen 1520.

In screen 1530, if the processor 160 receives a user input to select a keyword UI 1531 for filtering only product information about glasses to display the filtered product information, the processor 160 may display screen 1540.

In screen 1540, the processor 160 may display only product information 1542 about the glasses and may display a selected keyword UI 1541 to be different from the unselected keyword.

(5) The Storing of the Provided Information History and User Input History

The processor 160 may store an information history and a user input history, which are provided depending on the above-described process, in the memory 120. The processor 160 may store the information history and the user input history, which are provided for each user interface selected by a user.

For example, the information history provided in association with shopping may include a product image, a product name, a manufacturer, and the like. The information history provided in association with a book may include a book cover image, a book name, an author, price and rating. The information history provided in association with a text may include the extracted text, the translated text, or the like. The information history provided in association with a place may include land mark information, or the like. The information history provided in association with image search may include a keyword and a heavily used image. The information history provided in association with a wine may include a wine label and a wine name. The information history provided in association with a QR code may include information defined in the QR code.

Figure 16:
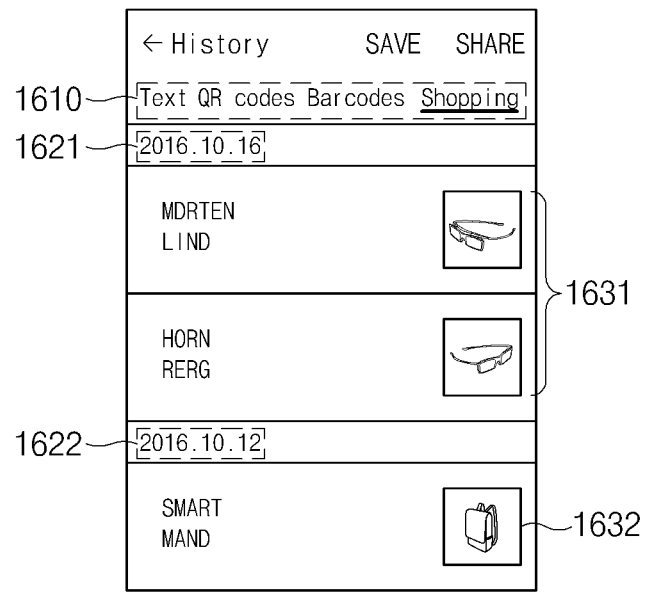
FIG. 16 is a diagram illustrating an example screen in which an information history that a processor provides is managed, according to an embodiment.

FIG. 16 is a diagram illustrating an example screen in which an information history that the processor 160 provides is managed, according to an embodiment.

Referring to FIG. 16, the processor 160 may set taps 1610 to display a history for each user interface selected by a user. FIG. 16 illustrates a history according to a shopping tap. The processor 160 may display a history for each date. As illustrated in FIG. 16, the processor 160 may display a shopping information history 1631 provided on Oct. 16, 2016 1621 and a shopping information history 1632 provided on Oct. 12, 2016 1622.

The provided information history and the provided user input history that are stored according to various embodiments may be used in above-described operation 305. For example, in the case where a history in which a user searches for glasses of company A is included in the user input history, when the processor 160 searches for information about the glasses, the processor 160 may use a query to search for the glasses of company A as a reference.

Figure 17:
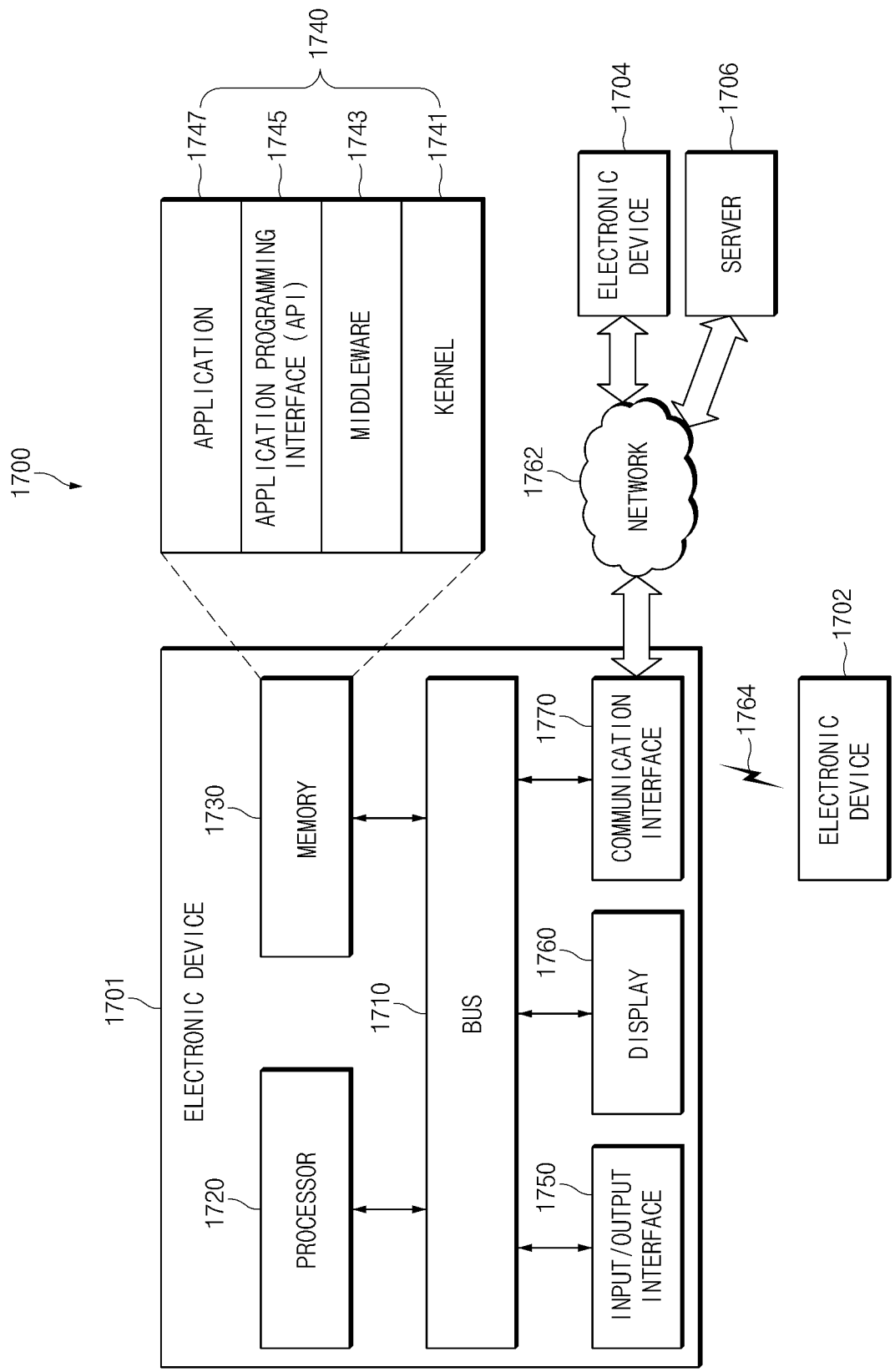
FIG. 17 is a diagram illustrating the electronic device in a network environment according to various embodiments.

FIG. 17 is a diagram illustrating an electronic device in a network environment system, according to various embodiments.

Referring to FIG. 17, according to various embodiments, an electronic device 1701, a first electronic device 1702, a second electronic device 1704, or a server 1706 may be connected each other over a network 1762 or a short range wireless communication connection 1764. The electronic device 1701 may include a bus 1710, a processor 1720, a memory 1730, an input/output interface 1750, a display 1760, and a communication interface 1770. According to an embodiment, the electronic device 1701 may not include at least one of the above-described elements or may further include other element(s).

For example, the bus 1710 may interconnect the above-described elements 1720 to 1770 and may include a circuit for conveying communications (e.g., a control message and/or data) among the above-described elements.

The processor 1720 (e.g., the processor 160) may include various processing circuitry, such as, for example, and without limitation, one or more of a dedicated processor, a central processing unit (CPU), an application processor (AP), or a communication processor (CP), or the like. For example, the processor 1720 may perform an arithmetic operation or data processing associated with control and/or communication of at least other elements of the electronic device 1701.

The memory 1730 (e.g., the memory 120) may include a volatile and/or nonvolatile memory. For example, the memory 1730 may store instructions or data associated with at least one other element(s) of the electronic device 1701. According to an embodiment, the memory 1730 may store software and/or a program 1740. The program 1740 may include, for example, a kernel 1741, a middleware 1743, an application programming interface (API) 1745, and/or an application program (or "an application") 1747. At least a part of the kernel 1741, the middleware 1743, or the API 1745 may be referred to as an "operating system (OS)".

For example, the kernel 1741 may control or manage system resources (e.g., the bus 1710, the processor 1720, the memory 1730, and the like) that are used to execute operations or functions of other programs (e.g., the middleware 1743, the API 1745, and the application program 1747). Furthermore, the kernel 1741 may provide an interface that allows the middleware 1743, the API 1745, or the application program 1747 to access discrete elements of the electronic device 1701 so as to control or manage system resources.

The middleware 1743 may perform, for example, a mediation role such that the API 1745 or the application program 1747 communicates with the kernel 1741 to exchange data.

Furthermore, the middleware 1743 may process task requests received from the application program 1747 according to a priority. For example, the middleware 1743 may assign the priority, which makes it possible to use a system resource (e.g., the bus 1710, the processor 1720, the memory 1730, or the like) of the electronic device 1701, to at least one of the application program 1747. For example, the middleware 1743 may process the one or more task requests according to the priority assigned to the at least one, which makes it possible to perform scheduling or load balancing on the one or more task requests.

The API 1745 may be, for example, an interface through which the application program 1747 controls a function provided by the kernel 1741 or the middleware 1743, and may include, for example, at least one interface or function (e.g., an instruction) for a file control, a window control, image processing, a character control, or the like.

The input/output interface 1750 may include various input/output circuitry and play a role, for example, of an interface which transmits an instruction or data input from a user or another external device, to other element(s) of the electronic device 1701. Furthermore, the input/output interface 1750 may output an instruction or data, received from other element(s) of the electronic device 1701, to a user or another external device.

The display 1760 (e.g., the display 130) may include, for example, a liquid crystal display (LCD), a light-emitting diode (LED) display, an organic LED (OLED) display, a microelectromechanical systems (MEMS) display, or an electronic paper display, or the like, but is not limited thereto. The display 1760 may display, for example, various contents (e.g., a text, an image, a video, an icon, a symbol, and the like) to a user. The display 1760 may include a touch screen and may receive, for example, a touch, gesture, proximity, or hovering input using an electronic pen or a part of a user's body.

For example, the communication interface 1770 may include various communication circuitry and establish communication between the electronic device 1701 and an external device (e.g., the first electronic device 1702, the second electronic device 1704, or the server 1706). For example, the communication interface 1770 may be connected to the network 1762 over wireless communication or wired communication to communicate with the external device (e.g., the second electronic device 1704 or the server 1706).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 1764. The short range communication 1764 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 1701 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1762 may include at least one of telecommunications networks, for example, a computer network (e.g., LAN or WAN), an Internet, or a telephone network.

Each of the first and second electronic devices 1702 and 1704 may be a device of which the type is different from or the same as that of the electronic device 1701. According to an embodiment, the server 1706 may include a group of one or more servers. According to various embodiments, all or a portion of operations that the electronic device 1701 will perform may be executed by another or plural electronic devices (e.g., the first electronic device 1702, the second electronic device 1704 or the server 1706). According to an embodiment, in the case where the electronic device 1701 executes any function or service automatically or in response to a request, the electronic device 1701 may not perform the function or the service internally, but, alternatively additionally, it may request at least a portion of a function associated with the electronic device 1701 from another device (e.g., the electronic device 1702 or 1704 or the server 1706). The other electronic device may execute the requested function or additional function and may transmit the execution result to the electronic device 1701. The electronic device 1701 may provide the requested function or service using the received result or may additionally process the received result to provide the requested function or service. To this end, for example, cloud computing, distributed computing, or client-server computing may be used.

Figure 18:
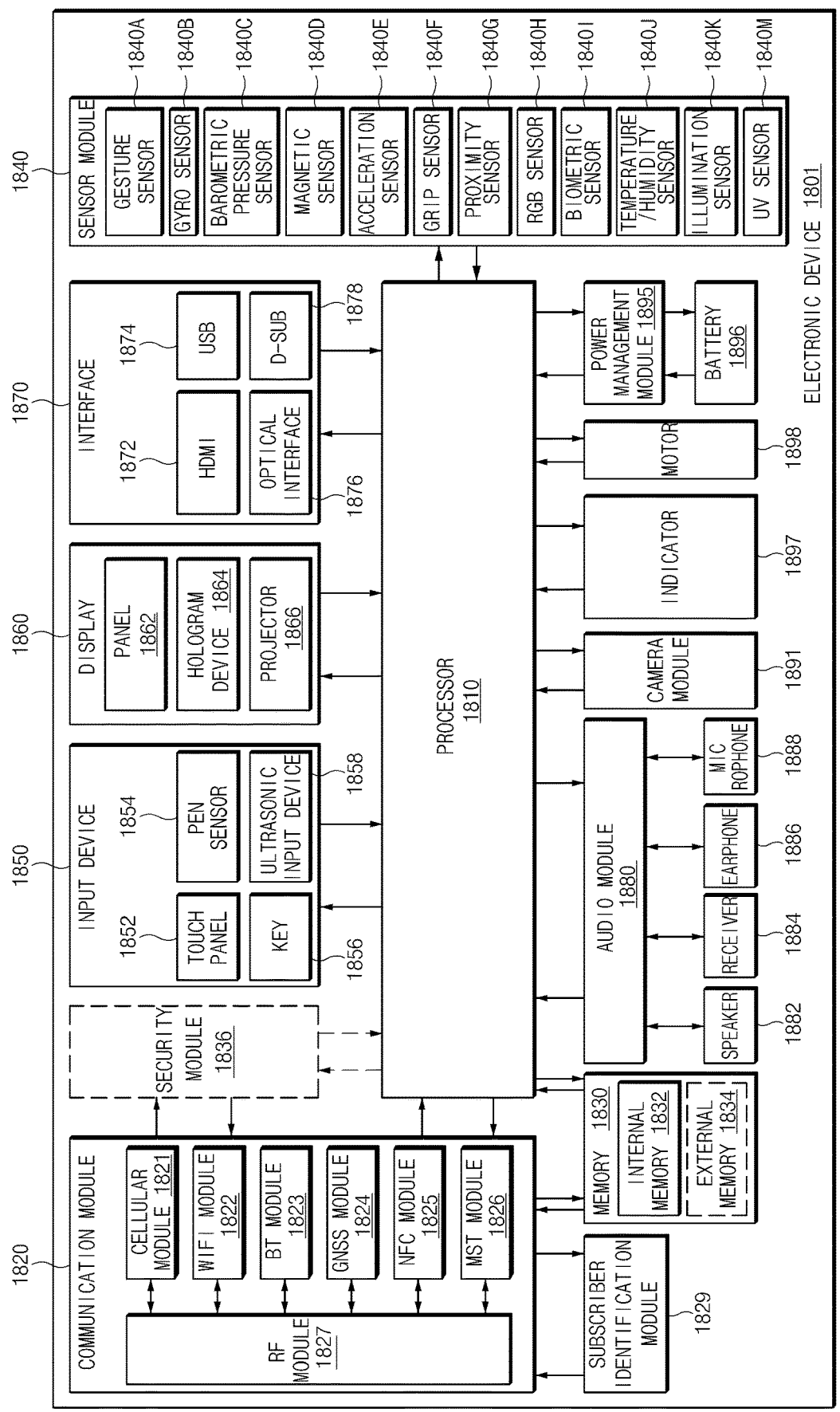
FIG. 18 is a block diagram illustrating an example of the electronic device according to various embodiments.

FIG. 18 is a block diagram illustrating an example electronic device, according to various embodiments.

Referring to FIG. 18, an electronic device 1801 may include, for example, all or a part of the electronic device 1701 illustrated in FIG. 17. The electronic device 1801 may include one or more processors (e.g., an application processor (AP)) 1810, a communication module 1820, a subscriber identification module 1829, a memory 1830, a security module 1836, a sensor module 1840, an input device 1850, a display 1860, an interface 1870, an audio module 1880, a camera module 1891, a power management module 1895, a battery 1896, an indicator 1897, and a motor 1898.

The processor 1810 (e.g., the processor 160) may include various processing circuitry and drive, for example, an operating system (OS) or an application to control a plurality of hardware or software elements connected to the processor 1810 and may process and compute a variety of data. For example, the processor 1810 may be implemented with a System on Chip (SoC). According to an embodiment, the processor 1810 may further include a graphic processing unit (GPU) and/or an image signal processor. The processor 1810 may include at least a part (e.g., a cellular module 1821) of elements illustrated in FIG. 18. The processor 1810 may load an instruction or data, which is received from at least one of other elements (e.g., a nonvolatile memory), into a volatile memory and process the loaded instruction or data. The processor 1810 may store a variety of data in the nonvolatile memory.

The communication module 1820 (e.g., the communication circuit 150) may be configured the same as or similar to the communication interface 1770 of FIG. 17. The communication module 1820 may include various modules including various communication circuitry, such as, for example, and without limitation, the cellular module 1821, a Wi-Fi module 1822, a Bluetooth (BT) module 1823, a GNSS module 1824 (e.g., a GPS module, a Glonass module, a Beidou module, or a Galileo module), a near field communication (NFC) module 1825, a MST module 1826 and a radio frequency (RF) module 1827, or the like.

The cellular module 1821 may provide, for example, voice communication, video communication, a character service, an Internet service, or the like over a communication network. According to an embodiment, the cellular module 1821 may perform discrimination and authentication of the electronic device 1801 within a communication network using the subscriber identification module (e.g., a SIM card) 1829. According to an embodiment, the cellular module 1821 may perform at least a portion of functions that the processor 1810 provides. According to an embodiment, the cellular module 1821 may include a communication processor (CP).

Each of the Wi-Fi module 1822, the BT module 1823, the GNSS module 1824, the NFC module 1825, or the MST module 1826 may include a processor for processing data exchanged through a corresponding module, for example. According to an embodiment, at least a part (e.g., two or more) of the cellular module 1821, the Wi-Fi module 1822, the BT module 1823, the GNSS module 1824, the NFC module 1825, or the MST module 1826 may be included within one Integrated Circuit (IC) or an IC package.

For example, the RF module 1827 may transmit and receive a communication signal (e.g., an RF signal). For example, the RF module 1827 may include a transceiver, a power amplifier module (PAM), a frequency filter, a low noise amplifier (LNA), an antenna, or the like. According to another embodiment, at least one of the cellular module 1821, the Wi-Fi module 1822, the BT module 1823, the GNSS module 1824, the NFC module 1825, or the MST module 1826 may transmit and receive an RF signal through a separate RF module.

The subscriber identification module 1829 may include, for example, a card and/or embedded SIM that includes a subscriber identification module and may include unique identity information (e.g., integrated circuit card identifier (ICCID)) or subscriber information (e.g., integrated mobile subscriber identity (IMSI)).

The memory 1830 (e.g., the memory 120 or the memory 1730) may include an internal memory 1832 and/or an external memory 1834. For example, the internal memory 1832 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1834 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1834 may be operatively and/or physically connected to the electronic device 1801 through various interfaces.

A security module 1836 may be a module that includes a storage space of which a security level is higher than that of the memory 1830 and may be a circuit that guarantees safe data storage and a protected execution environment. The security module 1836 may be implemented with a separate circuit and may include a separate processor. For example, the security module 1836 may be in a smart chip or a secure digital (SD) card, which is removable, or may include an embedded secure element (eSE) embedded in a fixed chip of the electronic device 1801. Furthermore, the security module 1836 may operate based on an operating system (OS) that is different from the OS of the electronic device 1801. For example, the security module 1836 may operate based on java card open platform (JCOP) OS.

The sensor module 1840 (e.g., the sensor circuit 140) may measure, for example, a physical quantity or may detect an operation state of the electronic device 1801. The sensor module 1840 may convert the measured or detected information to an electrical signal. For example, the sensor module 1840 may include at least one of a gesture sensor 1840A, a gyro sensor 1840B, a barometric pressure sensor 1840C, a magnetic sensor 1840D, an acceleration sensor 1840E, a grip sensor 1840F, the proximity sensor 1840G, a color sensor 1840H (e.g., red, green, blue (RGB) sensor), a biometric sensor 1840I, a temperature/humidity sensor 1840J, an illuminance (illumination) sensor 1840K, and/or an UV sensor 1840M. Although not illustrated, additionally or generally, the sensor module 1840 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1840 may further include a control circuit for controlling at least one or more sensors included therein. According to an embodiment, the electronic device 1801 may further include a processor that is a part of the processor 1810 or independent of the processor 1810 and is configured to control the sensor module 1840. The processor may control the sensor module 1840 while the processor 1810 remains at a sleep state.

The input device 1850 may include various input circuitry, such as, for example, and without limitation, a touch panel 1852, a (digital) pen sensor 1854, a key 1856, or an ultrasonic input device 1858, or the like. For example, the touch panel 1852 may use at least one of capacitive, resistive, infrared and ultrasonic detecting methods. Also, the touch panel 1852 may further include a control circuit. The touch panel 1852 may further include a tactile layer to provide a tactile reaction to a user.

The (digital) pen sensor 1854 may be, for example, a part of a touch panel or may include an additional sheet for recognition. The key 1856 may include, for example, a physical button, an optical key, a keypad, or the like. The ultrasonic input device 1858 may detect (or sense) an ultrasonic signal, which is generated from an input device, through a microphone (e.g., a microphone 1888) and may check data corresponding to the detected ultrasonic signal.

The display 1860 (e.g., the display 130 or the display 1760) may include a panel 1862, a hologram device 1864, or a projector 1866. The panel 1862 may be the same as or similar to the display 1760 illustrated in FIG. 17. The panel 1862 may be implemented, for example, to be flexible, transparent or wearable. The panel 1862 and the touch panel 1852 may be integrated into a single module. The hologram device 1864 may display a stereoscopic image in a space using a light interference phenomenon. The projector 1866 may project light onto a screen so as to display an image. For example, the screen may be arranged in the inside or the outside of the electronic device 1801. According to an embodiment, the display 1860 may further include a control circuit for controlling the panel 1862, the hologram device 1864, or the projector 1866.

The interface 1870 may include various interface circuitry, such as, for example, and without limitation, a high-definition multimedia interface (HDMI) 1872, a universal serial bus (USB) 1874, an optical interface 1876, and/or a D-subminiature (D-sub) 1878, or the like. The interface 1870 may be included, for example, in the communication interface 1770 illustrated in FIG. 17. Additionally or generally, the interface 1870 may include, for example, a mobile high definition link (MHL) interface, a SD card/multi-media card (MMC) interface, or an infrared data association (IrDA) standard interface.

The audio module 1880 may convert a sound and an electric signal in dual directions. At least a part of the audio module 1880 may be included, for example, in the input/output interface 1750 illustrated in FIG. 17. The audio module 1880 may process, for example, sound information that is input or output through a speaker 1882, a receiver 1884, an earphone 1886, or the microphone 1888.

For example, the camera module 1891 (e.g., the camera module 110) may shoot a still image or a video. According to an embodiment, the camera module 1891 may include at least one or more image sensors (e.g., a front sensor or a rear sensor), a lens, an image signal processor (ISP), or a flash (e.g., an LED or a xenon lamp).

The power management module 1895 may manage, for example, power of the electronic device 1801. According to an embodiment, a power management integrated circuit (PMIC), a charger IC, or a battery or fuel gauge may be included in the power management module 1895. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1896 and a voltage, current or temperature thereof while the battery is charged. The battery 1896 may include, for example, a rechargeable battery and/or a solar battery.

The indicator 1897 may display a specific state of the electronic device 1801 or a part thereof (e.g., the processor 1810), such as a booting state, a message state, a charging state, and the like. The motor 1898 may convert an electrical signal into a mechanical vibration and may generate the following effects: vibration, haptic, and the like. Although not illustrated, a processing device (e.g., a GPU) for supporting a mobile TV may be included in the electronic device 1801. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 19:
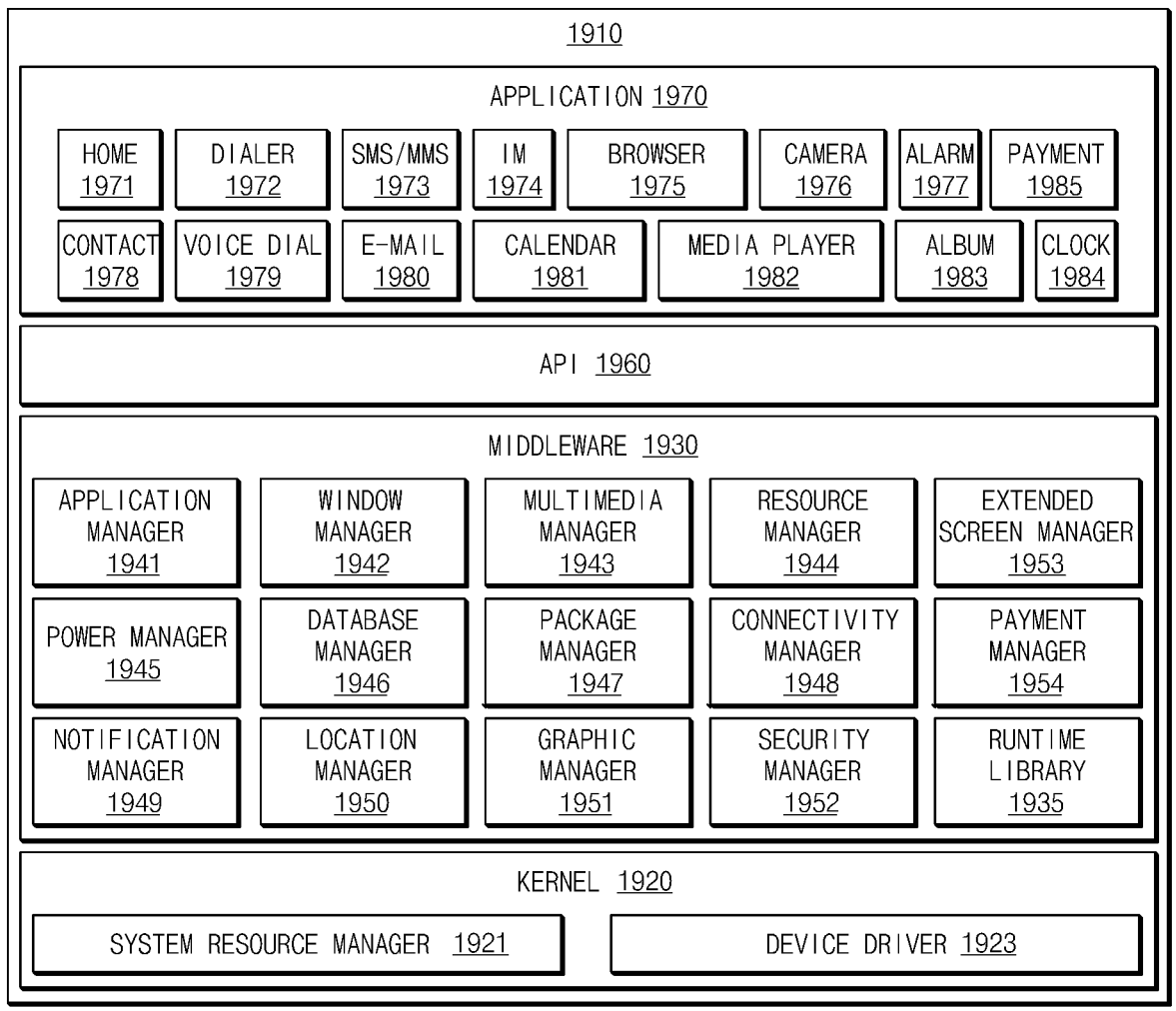
FIG. 19 is a block diagram illustrating an example program module according to various embodiments.

FIG. 19 is a block diagram illustrating an example program module, according to various embodiments.

According to an embodiment, a program module 1910 (e.g., the program 1740) may include an operating system (OS) to control resources associated with an electronic device (e.g., the electronic device 1701), and/or diverse applications (e.g., the application program 1747) driven on the OS. The OS may be, for example, Android, iOS, Windows, Symbian, or Tizen.

The program module 1910 may include a kernel 1920, a middleware 1930, an application programming interface (API) 1960, and/or an application 1970. At least a portion of the program module 1910 may be preloaded on an electronic device or may be downloadable from an external electronic device (e.g., the first electronic device 1702, the second electronic device 1704, the server 1706, or the like).

The kernel 1920 (e.g., the kernel 1741) may include, for example, a system resource manager 1921 and/or a device driver 1923. The system resource manager 1921 may perform control, allocation, or retrieval of system resources. According to an embodiment, the system resource manager 1921 may include a process managing unit, a memory managing unit, or a file system managing unit. The device driver 1923 may include, for example, a display driver, a camera driver, a Bluetooth driver, a shared memory driver, a USB driver, a keypad driver, a Wi-Fi driver, an audio driver, or an inter-process communication (IPC) driver.

The middleware 1930 may provide, for example, a function that the application 1970 needs in common, or may provide diverse functions to the application 1970 through the API 1960 to allow the application 1970 to efficiently use limited system resources of the electronic device. According to an embodiment, the middleware 1930 (e.g., the middleware 1743) may include at least one of a runtime library 1935, an application manager 1941, a window manager 1942, a multimedia manager 1943, a resource manager 1944, a power manager 1945, a database manager 1946, a package manager 1947, a connectivity manager 1948, a notification manager 1949, a location manager 1950, a graphic manager 1951, a security manager 1952, an extended screen manager 1953, and/or a payment manager 1954, or the like.

The runtime library 1935 may include, for example, a library module that is used by a compiler to add a new function through a programming language while the application 1970 is being executed. The runtime library 1935 may perform input/output management, memory management, or capacities about arithmetic functions.

The application manager 1941 may manage, for example, a life cycle of at least one application of the application 1970. The window manager 1942 may manage a graphic user interface (GUI) resource that is used in a screen. The multimedia manager 1943 may identify a format necessary for playing diverse media files, and may perform encoding or decoding of media files using a codec suitable for the format. The resource manager 1944 may manage resources such as a storage space, memory, or source code of at least one application of the application 1970.

The power manager 1945 may operate, for example, with a basic input/output system (BIOS) to manage the capacity of a battery, a temperature, or power, and may determine or provide power information for an operation of an electronic device, using the corresponding information about one of the capacity of the battery, the temperature, or the power. The power manager 1945 may operate, for example, with a basic input/output system (BIOS) to manage a battery or power, and may provide power information for an operation of an electronic device.

The connectivity manager 1948 may manage, for example, wireless connection such as Wi-Fi or Bluetooth. The notification manager 1949 may display or notify an event such as arrival message, appointment, or proximity notification in a mode that does not disturb a user. The location manager 1950 may manage location information about an electronic device. The graphic manager 1951 may manage a graphic effect that is provided to a user, or manage a user interface relevant thereto. The security manager 1952 may provide a general security function necessary for system security, user authentication, or the like. For example, the extended screen manager 1953 may determine the area of a display in which a graphic image is displayed. According to an embodiment, the extended screen manager 1953 may manage information to be provided, a graphic effect, or a user interface associated with the information to be provided or the graphic effect, through the area of a display determined such that a graphic image is displayed.

According to an embodiment, in the case where an electronic device (e.g., the electronic device 1701) includes a telephony function, the middleware 1930 may further include a telephony manager for managing a voice or video call function of the electronic device. The middleware 1930 may include a middleware module that combines diverse functions of the above-described elements. The middleware 1930 may provide a module specialized to each OS kind to provide differentiated functions. Additionally, the middleware 1930 may dynamically remove a part of the preexisting elements or may add new elements thereto.

The API 1960 (e.g., the API 1745) may be, for example, a set of programming functions and may be provided with a configuration that is variable depending on an OS. For example, in the case where an OS is Android or iOS, it may provide one API set per platform. In the case where an OS is Tizen, it may provide two or more API sets per platform.

The application 1970 (e.g., the application program 1747) may include, for example, one or more applications capable of providing functions for a home 1971, a dialer 1972, an SMS/MMS 1973, an instant message (IM) 1974, a browser 1975, a camera 1976, an alarm 1977, a contact 1978, a voice dial 1979, an e-mail 1980, a calendar 1981, a media player 1982, an album 1983, a timepiece (clock) 1984, and/or a payment 1935, or the like. Additionally, though not shown, the applications may include various other applications, such as, for example, and without limitation, applications for offering health care (e.g., measuring an exercise quantity, blood sugar, or the like) or environment information (e.g., information of barometric pressure, humidity, temperature, or the like).

According to an embodiment, the application 1970 may include an application (hereinafter referred to as "information exchanging application" for descriptive convenience) to support information exchange between an electronic device (e.g., the electronic device 1701) and an external electronic device (e.g., the first electronic device 1702 or the second electronic device 1704). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1970 may include an application (e.g., a health care application of a mobile medical device) that is assigned in accordance with an attribute of an external electronic device. According to an embodiment, the application 1970 may include an application that is received from an external electronic device (e.g., the first electronic device 1702, the second electronic device 1704, or the server 1706). According to an embodiment, the application 1970 may include a preloaded application or a third party application that is downloadable from a server. The names of elements of the program module 1910 according to the embodiment may be modifiable depending on kinds of operating systems.

According to various embodiments, at least a portion of the program module 1910 may be implemented by software, firmware, hardware, or a combination of two or more thereof. At least a portion of the program module 1910 may be implemented (e.g., executed), for example, by the processor (e.g., the processor 1810). At least a portion of the program module 1910 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include, for example, and without limitation, at least one of a dedicated processor, a CPU, an application-specific IC (ASIC) chip, a field-programmable gate array (FPGA), and a programmable-logic device, or the like, for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1720), may cause the one or more processors to perform a function corresponding to the instruction. The computer-readable storage media, for example, may be the memory 1730.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a camera module comprising image capturing circuitry;
   a display;
   a memory configured to store a camera application associated with the camera module;
   a processor electrically connected to the camera module, the display, and the memory,
   wherein the processor is configured to:
   execute the camera application;
   obtain a preview image including a first object and a second object using the camera module;
   determine an attribution of the first and the second object;
   determine a first user interface corresponding to the first object and a second user interface corresponding to the second object based on the attribution of the first and the second object, wherein the first user interface is different from the second user interface;

display, in the display, a screen including the preview image, the first user interface, and the second user interface;

obtain a first image including the first object using the camera module in a first scheme corresponding to the first user interface if the first user interface is selected;

obtain a second image including the second object using the camera module in a second scheme corresponding to the second user interface different from the first scheme if the second user interface is selected; and display information associated with the first object or the second object, in the display using the first image or the second image.

2. The electronic device of claim 1, wherein the processor is configured to:

display a guide interface in the display, a size of the guide interface being capable of being adjusted on the preview image; and display a user interface corresponding to an object in the display, the object being included in the guide interface, from among the first object and the second object.

3. The electronic device of claim 2, wherein the size of the guide interface is capable of being adjusted and/or the guide interface is capable of moving on the preview image, based on an input.

4. The electronic device of claim 1, wherein the processor is configured to:

determine an attribution corresponding to the first object and the second object; and display the first user interface corresponding to the first object and the second user interface corresponding to the second object in the display based at least on the determined attribution.

5. The electronic device of claim 4, wherein the attribution includes a type of an object, wherein types of at least one among the first object and/or the second object are plural, and wherein the processor is configured to:

display user interfaces in the display, the user interfaces corresponding to one or more types, which are determined based on a specified priority, from among the plurality of types when displaying a user interface corresponding to the at least one object having the plurality of types.

6. The electronic device of claim 4, wherein the processor is configured to:

display one or more pieces of attribution information corresponding to the determined attribution in the display in association with at least one of the first object and the second object.

7. The electronic device of claim 1, wherein the first scheme and/or the second scheme includes a capture mode setting configured to obtain the first image and/or the second image using the camera module.

8. The electronic device of claim 7, wherein the capture mode setting includes one or more of a flash operation setting, a resolution setting of the obtained first image and/or the obtained second image, a zoom setting, an ISO setting, an exposure setting, an aperture setting, and/or a high dynamic range (HDR) mode setting.

9. The electronic device of claim 1, wherein the processor is configured to:

change a resolution of the first image based on the first object and provide information associated with the first object included in the first image based on the first user interface and the first image, the resolution of which is changed if the first user interface is selected; and change a resolution of the second image based on the second object, and provide information associated with the second object included in the second image based on the second user interface and the second image, the resolution of which is changed if the second user interface is selected.

10. The electronic device of claim 1, further comprising:

a memory; and a communication circuit, wherein the processor is configured to:

provide information associated with the one or more objects included in the first image, using a first database, at least part of which is stored in the memory if the first user interface is selected; and provide information associated with the one or more objects included in the second image, using a second database, at least part of which is stored in the outside of the electronic device if the second user interface is selected.

11. An electronic device comprising:

a memory configured to store an image;

a camera module comprising image capturing circuitry;

a display; and a processor electrically connected to the memory and the display, wherein the processor is configured to:

display a first image which is stored in the memory and which includes one or more objects, using the display;

determine an attribution of each of the one or more objects;

determine a plurality of different user interfaces corresponding to the one or more objects based on the attribution of each of the one or more objects;

display the plurality of different user interfaces corresponding to the one or more objects using the display;

receive an input to select a first user interface from among the plurality of different user interfaces;

obtain a second image including the one or more objects from the first image using the camera module in a scheme corresponding to a type of the selected first user interface; and provide information associated with an object included in the second image, based on the type of the selected first user interface and the obtained second image.

12. The electronic device of claim 11, wherein the memory stores category information about at least one object among the one or more objects included in the first image, and wherein the processor is configured to:

display the plurality of user interfaces corresponding to the one or more objects based on the category information stored in the memory.

13. The electronic device of claim 12, wherein the processor is configured to:

display the first user interface corresponding to the at least one object of which the category information is stored, using the display.

14. The electronic device of claim 11, wherein the scheme includes a scheme to obtain the second image from a partial area including the one or more objects in the first image or a scheme to obtain the second image at a specified resolution.

15. The electronic device of claim 11, wherein the processor is configured to:

obtain the second image at a specified resolution or higher if the selected first user interface is associated with a text.

16. The electronic device of claim 11, further comprising:
a communication circuit,
wherein the processor is configured to:
based on at least one of the selected first user interface or the one or more objects that the obtained second image includes,
provide information associated with the one or more objects based on information stored in the memory; or
transmit the second image or information obtained from the second image to an external server using the communication circuit and receive the information associated with the one or more objects from the external server to provide the information.

17. An electronic device comprising:
a camera module comprising image capturing circuitry;
a memory;
a display; and
a processor electrically connected to the memory and the display,
wherein the processor is configured to:
display a first image including one or more objects using the display;
display a plurality of different user interfaces based on one attribution information which is determined based at least on context information from among pieces of attribution information corresponding to the one or more objects;
receive an input to select a user interface from among the plurality of different user interfaces;
obtain a second image including the one or more objects using the camera module in a scheme corresponding to the selected user interface; and
provide information associated with the one or more objects using the second image.

18. The electronic device of claim 17,
wherein the first image is a preview image obtained through the camera module.

19. The electronic device of claim 17, wherein the context information includes a current time, a location of the electronic device, and/or a user input history stored in the memory.

20. The electronic device of claim 17, wherein the attribution information includes information about a function provided in association with the one or more objects, and
wherein the provided function includes text extraction, translation, similar image search, shopping information search, QR code recognition, and/or place information search.

* * * * *